United States Patent [19]

Desurvire et al.

[11] Patent Number: 4,952,059
[45] Date of Patent: Aug. 28, 1990

[54] REENTRANT FIBER RAMAN GYROSCOPE

[75] Inventors: Emmanuel Desurvire, Natawan, N.J.; Byoung Y. Kim, Menlo Park; Herbert J. Shaw, Stanford, both of Calif.

[73] Assignee: The Board of Trustees of the Leland Stanford Junior University, Stanford, Calif.

[21] Appl. No.: 180,596

[22] Filed: Apr. 6, 1988

Related U.S. Application Data

[63] Continuation of Ser. No. 872,052, Jun. 6, 1986, abandoned.

[51] Int. Cl.$^5$ .............................................. G01B 9/02
[52] U.S. Cl. ................................................ 356/350
[58] Field of Search ...................................... 356/350

[56] References Cited

U.S. PATENT DOCUMENTS 4,323,310 4/1982 Shaw et al. ...................... 356/350
4,708,421 11/1987 De Survire et al. ............. 350/96.15

FOREIGN PATENT DOCUMENTS 0104942 4/1984 European Pat. Off. .

OTHER PUBLICATIONS

Vali et al., "Fiber Ring Interferometer", *Applied Optics*, vol. 15, No. 5, May 1976, pp. 1099-1102.
Ezekiel et al., "Passive Ring Resonator Laser Gyroscope", *Applied Physics Letters*, vol. 30, No. 9, May 1, 1977, pp. 478-480.
Cahill et al., "Phase Nulling Fiber-Optic Laser Gyro", *Optics Letters*, vol. 4, No. 3, Mar. 1979, pp. 93-95.
Lefevre et al., "Double Closed-Loop Hybrid Fiber Gyroscope Using Digital Phase Ramp", Proceedings of OFS 3, Post-Deadline Paper PSD 7, San Diego, 1985.
Pavlath et al., "Re-Entrant Fiber Optic Rotation Sensors", Fiber Optic Rotation Sensors and Related Technologies, edited by Ezekiel et al., 1982, pp. 364-366.
Stolen et al., "Raman Gain in Glass Optical Waveguides", *Applied Physics Letters*, vol. 22, No. 6, pp. 276-278.
Stolen et al., "Parametric Amplification and Frequency Conversion in Optical Fibers", *IEEE J. of Quantum Elec.*, vol. QE-18, No. 7, pp. 1062-1072.
Bloembergen, "Nonlinear Optics", W. A. Benjamin Inc., London 1965.
Aoki et al., "Efficient Backward and Forward Pumping ... Silica Fibers", *Electronics Letters*, vol. 19, No. 16, pp. 620-622.
Kanazawa et al., "Raman Amplification in ... Polarization-Preserving Optical Fibers", *J. Optical Soc. Am. B.*, vol. 2, No. 4, 515 (1985), pp. 515-521.
Maker et al., "Study of Optical Effects Due to an Induced ... Field Strength", *Physical Review*, vol. 137, No. 3A, pp. A801-A818.
Chraplyvy et al., "Carrier-Induced Phase Noise in Angle-Modulated ... Systems", *J. of Lightwave Tech.*, vol. LT-2, No. 1, 6 (1984), pp. 6-10.
Shimoda et al., "Fluctuations in Amplification of Quanta with ... Amplifiers", *J. Physic. Soc. Japan*, vol. 12, No. 6, pp. 686-700.

(List continued on next page.)

*Primary Examiner*—Vincent P. McGraw
*Attorney, Agent, or Firm*—Knobbe, Martens, Olson & Bear

[57] ABSTRACT

A re-entrant fiber optic interferometer comprises an optical fiber, forming a loop for recirculating an optical signal in the loop. The loop of optical fiber comprises an active material which emits photons at a first wavelength and responds to pumping in a second wavelength. Signal light at the first wavelength is input to the loop for circulation therein, and pump light at the second wavelength is input to the loop to optically pump the active material to emit light at the first wavelength. The invention also includes a multiplexing coupler which has different coupling ratios for the pump light and the signal light, such that only a fraction of the signal light is coupled out of the loop on each circulation about the loop, but substantially all of the pump light is coupled out of the loop after a single circulation, thereby suppressing pump phase noise in the loop.

8 Claims, 11 Drawing Sheets

OTHER PUBLICATIONS

A. Yariv, "Quantum Electronics", 2nd Edition, New York, pp. 473-477.

Born et al., *Principles of Optics*, Pergamon Press, 6th Edition, 1980, p. 544.

Ezekiel et al., "Fiber Optic Rotation Sensors: Tutorial Review", *Fiber Optic Rotation Sensors and Related Technologies*, vol. 32, New York, 1982, pp. 2-26.

Cotter, "Observation of Stimulated Brillouin Scattering . . . ", *Elec. Letters*, vol. 18, No. 12, pp. 495-496.

Mollenauer et al., "Soliton Propagation in Long Fibers . . . Loss", *IEEE J. of Quantum Electronics*, vol. QE-22, No. 1, pp. 157-173.

M. Nakazawa, "Synchronously Pumped Fiber Raman Gyroscope", Optics Letters, vol. 10, No. 4, Apr. 1985, pp. 193-195.

Stolen et al., "A Fiber Raman Ring Laser", IEEE J. of Quantum Electronics, vol. QE-14, No. 11, Nov. 1978, pp. 860-862.

Davis et al., "Techniques for Shot-Noise-Limited Inertial Rotation Measurement . . . Sagnac Interferometer", Proceedings of SPIE, 157, 31 (1978).

Kim et al., "Phase-Reading, All-Fiber-Optic Gyroscope", *Optics Letters*, 9,378 (1984).

Arditty et al., "Reentrant Fiberoptic Approach to Rotation Sensing", Proceedings of SPIE, 157, 138 (1978).

Desurvire et al., "Theory and Implementation of a Raman Active Fiber Delay Line", *J. Lightwave Tech.*, vol. LT-4, No. 4, p. 426 (1986).

R. H. Stolen, "Polarization Effects in Fiber Raman and Brillouin Lasers", *IEEE J. of Quantum Elect.*, QE-15, No. 10, 1157 (1979).

Desurvire et al., "Signal-to-Noise Ration in Raman Active Fiber System . . . Lines", *J. of Lightwave Tech.*, vol. LT-4, No. 5, 560 (1986).

Cutler et al., "Limitations of Rotation Sensing by Scattering", *Optics Letters*, vol. 5, No. 11, 489 (1980).

J. E. Midwinter, Optical Fibers for Transmission, New York, J. Wiley & Sons, (1979).

Desurvire et al., "Raman Amplification of Recirculating Pulses in a Re-Entrant Fiber Loop", *Optics Letters*, vol. 10, No. 2, 83 (1985).

P. Ulrich, "Polarization and Depolarization in the Fiber-Optic Gyroscope", *Fiber Optic Rotation Sensors and Related Technologies*, vol. 32, p. 52, 1982.

Digonnet et al., "Wavelength Multiplexing in Single-Mode Fiber Couplers", *Applied Optics*, vol. 22, No. 3, 486 (1983).

Lefevre, "Single-Mode Fibre Fractional Wave Devices and Polarization Controllers", *Electronic Letters*, vol. 16, No. 20, 778 (1980).

Bergh et al., "Single-Mode Fibre Optic Directional Coupler", *Electronic Letters*, vol. 16, No. 7, 760 (1980).

Tur et al., "Theory of Laser Phase Noise in Recirculating Fiber Optic Delay Lines", *IEEE J. of Lightwave Tech.*, vol. LT-3, No. 1, 20 (1985).

Youngquist et al., "Effects of Normal Node Loss . . . and Interferometers", *IEEE J. of Quantum Electronics*, vol. QE-19, No. 12, 1888 (1983).

REENTRANT FIBER RAMAN GYROSCOPE

This application is a continuation of application Ser. No. 872,052, filed June 6, 1986, now abandoned.

FIELD OF THE INVENTION

The present invention relates to an active reentrant fiber interferometer for use as a gyroscope.

A number of journal references are listed at the end of this specification which will be referred to throughout the specification. For brevity, the journal references will be referenced to by their number. These references will be enclosed by brackets [] so as to distinguish them from drawing reference numerals and letters which will be enclosed by parentheses (). Thus, for example, [1] refers to journal reference No. 1 and [7, 8] refer to journal reference Nos. 7 and 8. The specification also includes an appendix which sets forth various equations relevant to the present invention.

BACKGROUND OF THE INVENTION

Fiber optic rotation sensors have been developed in many different forms. For the passive single-path multiturn Sagnac interferometer approaches [1], the Sagnac phase shift is magnified by using many turns of optical fiber in order to increase the sensitivity of rotation sensing. For the passive resonator approaches [2], the enhancement of Sagnac phase shift is realized by recirculation of cw optical wave in relatively short fiber loop. These approaches to fiber gyroscopes have been demonstrated with high rotation sensitivity. In order to achieve wide linear dynamic range with digital rotation output from these gyroscopes, however, nonreciprocal phase shifters (such as frequency shifter [3,4], high speed phase modulator [5]) or electronic signal processors [6] are necessary. The performance of the fiber gyroscope is then limited by that of these added components.

The reentrant approach to fiber gyroscopes [7, 8], on the other hand, provides an inherent linear scale factor with frequency readout, as in ring laser gyroscopes but without associated frequency locking problem. In employs a multi-turn fiber coil where a single input pulse injected from external source recirculates around the fiber loop many times as a fraction of the optical signal is tapped out to be monitored at each turn. As the number of recirculation increases, the Sagnac phase shift induced between the counter propagating signal pulses is magnified by the number of recirculations. The system output then consists of a pulse train whose envelope is sinusoidally modulated with frequency linearly proportional to the rotation rate, as in the case of a ring laser gyroscope. This approach requires an optical amplifier in the sensing coil that can compensate for the signal loss at each recirculation, in order to obtain a large number of recirculations permitting sensitive rotation measurement.

It is well known that optical amplification in glass optical fibers can be easily achieved through Stimulated Raman scattering (SRS) process [9]. More recently, a large number of signal recirculation (of the order of $10^3$) was demonstrated in a fiber delay line using the SRS as an optical amplifier in the fiber circuit [10].

SUMMARY OF THE INVENTION

The present invention comprises a reentrant fiber optic interferometer for use as a gyroscope, in which a loop is formed from an optical fiber for recirculation of an optical signal therein. The loop comprises an active material for emitting photons at a first wavelength in response to pumping at a second wavelength.

The interferometer of the present invention includes a source of signal light for inputting an optical signal to the loop for circulation therein. The optical signal has a wavelength substantially equal to the first wavelength. A source of pump light is provided to input pump light to the loop for propagation therethrough to optically pump the active material. The pump light has a wavelength substantially equal to the second wavelength such that photons are generated in the loop at the first wavelength to amplify the optical signal.

The optical signal is split by a first coupler into a pair of optical signals which propagate around the loop in opposite directions and circulate in the loop. The loop is closed by a second, multiplexing coupler. This multiplexing coupler has different coupling ratios for the pump light and the optical signal such that only a fraction of each of the pair of optical signals is coupled out of the loop on each circulation, but substantially all of the pump light is coupled out of the loop after a single circulation to prevent the pump light from recirculating in the loop and thereby suppress pump phase noise in the loop.

A detection system is coupled to the loop to receive at least a portion of the fraction of the pair of optical signals coupled out of the loop on each circulation. The detection system detects phase differences between the pair of optical signals to measure rotation of the loop.

The invention also comprises a method of sensing rotation in which an optical signal having a first wavelength is input into a loop of optical fiber comprising an active material which emits photons at the first wavelength in response to pumping at a second wavelength. Pump light at the second wavelength is input into the loop for propagation therethrough to optically pump the active material such that photons are generated in the loop at the first wavelength to amplify the optical signal. Only a fraction of the optical signal is coupled out of the loop after propagation such that the optical signal recirculates a plural number of times in the loop. Pump phase noise in the loop is suppressed by coupling the pump light out of the loop after a single circulation to thereby prevent the pump light from recirculating in the loop.

DETAILED DESCRIPTION OF THE PREFERRED EMBODIMENT

Figure 1:
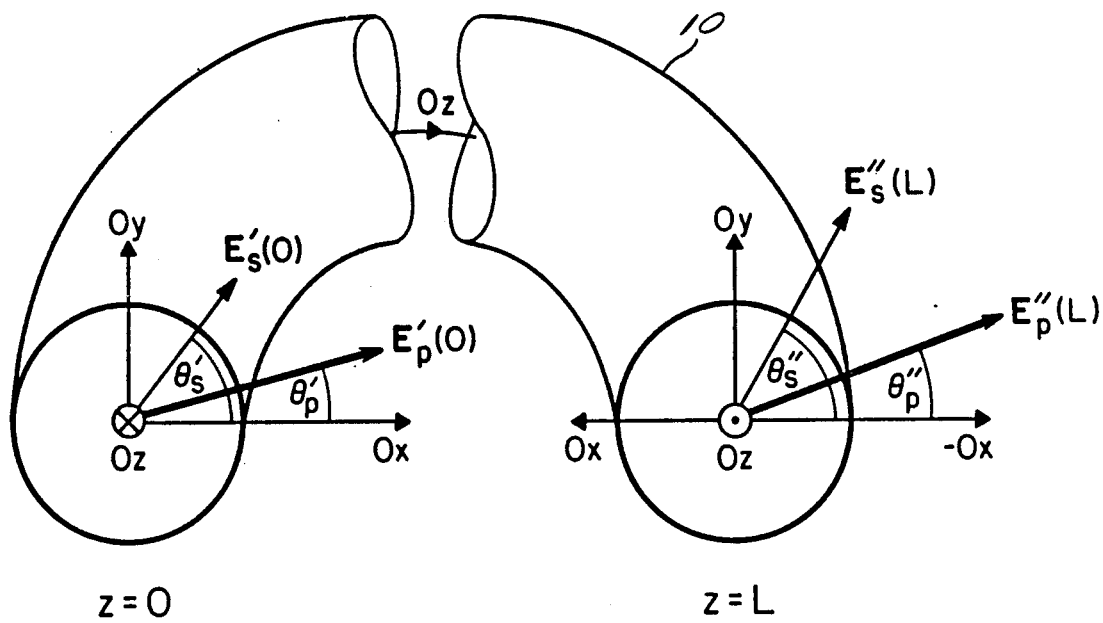
FIG. 1 is an illustration of a loop of optical fiber showing the electric fields of the pump light and signal light with respect to axes of birefringence of the fiber.

The present invention comprises an active reentrant fiber interferometer/gyroscope with internal Raman gain.

Raman amplification is used for increasing the number of signal recirculations in the rotation sensing loop, which improves system sensitivity to rotation rate. As in any amplification process, a certain amount of noise is generated, which causes an unavoidable decay of the signal-to-noise ratio (SNR). A theory is presented in Sections I-A to I-E, below, which shows that limitations in rotation sensing are caused by this concurrent amplification of noise as well as new types of nonreciprocal phase modulation associated with Raman gain. The analysis leads to an evaluation of the ultimate performance of reentrant fiber Raman gyroscopes, as determined by those fundamental limitations.

Several effects involved in the active operation of the reentrant fiber gyroscope are presented. These include Raman scattering, the optical Kerr effect and Rayleigh backscattering. Before describing the principle of active reentrant fiber gyroscopes, it is necessary to analyze the particular wave mixing interaction of a pump and a signal electric field propagating in a bidirectional fiber Raman amplifier and in two polarization modes.

First, the specific features of Raman amplification in a polarization-preserving optical fib with bidirectional pumping are studied with classical Maxwell formalism (Section I-A). It is shown that the pump power attenuation causes the Raman gain distribution along the fiber to be different for the two propagation directions, unless the same amount of pump power is coupled at each fiber end (symmetrical pumping scheme). It is also shown that the Raman gain is maximized when the pump and the signal waves are linearly polarized along either fiber birefringence axis. A time-dependent analysis leads to expressions for the gains corresponding to the forward and the backward propagation directions in presence of time-varying pump power.

The optical Kerr effect (OKE), or intensity-dependent phase modulation of the counterpropagating signal waves, is then analyzed with the same Maxwell formalism (Section I-B). For a given propagation direction, the OKE is induced by the two counterpropagating pump waves (pump-induced OJE), by the signal wave itself (self-induced OJE), or by the signal wave propagating in the opposite direction (cross-induced OKE). The magnitudes of each of these contributions are evaluated in the case of a birefringent fiber waveguide and time-dependent conditions. In the case where the input pump powers and/or the input signal powers are not equal, it is shown that the OKE induces a nonreciprocal phase modulation of the signal waves.

In Section I-C, two effects causing the degradation of the SNR are analyzed through a quantum model describing the evolution of the signal photon population. These effects are the amplification of the spontaneous Raman scattering (Stokes noise), which occurs in both forward and backward directions, and the amplification of the backward Rayleigh scattering. The two effects result in the generation of secondary waves which interfere with the primary signal waves. At this point of the analysis, it is necessary to consider the case of a Raman active, reentrant fiber loop within which these primary and secondary waves can recirculate many times. The mean numbers and the variances of the recirculating photon populations are evaluated through a photon statistics model. It is shown that due to various shot noise and bet noise sources, the overall signal intensity noise grows cubically with increasing number of recirculations in the loop, causing the SNR to decay.

In Section I-D, the reentrant fiber Raman gyroscope is analyzed as a fiber system supporting two polarization modes. It is shown that upon rotation of the reentrant fiber loop, the nonreciprocal Sagnac phase shift occurring between the two counterpropagating signal waves causes a sinusoidal modulation of the signal output, the frequency of which is proportional to the rotation rate.

Since the output frequency modulation scales as the rotation rate, large numbers of recirculations or long optical delays are needed in order to detect small rotations. However, the cubic decay of the SNR with increasing number of recirculations due to the buildup of the Stokes and the Rayleigh noises sets practical limits for rotation rate detection (Section I-E). In addition, the nonreciprocal phase noises induced by Kerr effect and backward Rayleigh scattering cause rotation rate errors which are growing with increasing optical delays. The magnitudes of the lowest detectable rotation rates (as determined by the SNR quantum limit) and their corresponding errors (as determined by the aforementioned side effects), are evaluated for different optimized systems. It is shown that with large coil diameters, rotation rate sensitivities below $10^{-3}$ deg/h are theoretically achievable.

I. THEORY

A theoretical analysis of the wave mixing between counterpropagating pump and signal fields interacting through Raman scattering and optical Kerr effects in a polarization-preserving fiber is presented. In the reentrant fiber gyroscope, these effects, along with backward Rayleigh scattering, are causes of nonreciprocity, which sets system performance limits. It is shown that, with large sensing loop diameter, rotation rate detection down to $10^{-3}$ deg/h could be theoretically achieved.

I. A. Raman gain in bidirectional fiber amplifier

In this section, the evolution of the signal polarization in a birefringent optical fiber having internal Raman gain is analyzed. The Raman gain is assumed to be small so that the parametric, or undepleted pump approximation can apply. In order to be relevant to the case of a re-entrant fiber gyroscope, the analysis should assume that the pump and the signal waves travel in the both directions of the fiber waveguide (10), shown in FIG. 1.

The pump electric field $E_p(r, m\ \theta, z, t)$ at frequency $\omega_p$ providing for distributed gain in the optical fiber is assumed to be the superposition of two counterpropagating pump waves $E_p'(r, \theta, z, t)$ and $E_p''(r, \theta, z, t)$. The signal electric field $E_s(r, \theta, z, t)$ at frequency $\omega_s$ is assumed likewise to be the superposition of two counterpropagating signal waves $E_s'(r, \theta, z, t)$. In the following analysis, it is shown that in the case of bidirectional pumping, Raman gain is caused by simultaneous forward and backward amplification processes, if non phase-matched terms participating in the interaction are neglected. The results are expressed in terms of gain matrices characterizing the two counterpropagating signal fields. From these results, optimal input conditions for the pump and the signal fields can be derived, and reciprocity properties of the fiber amplifier analyzed.

The following notations are chosen for the field expressions:

$$E_p'(r,\theta,z,t) = \frac{\psi_p(r,\theta)}{N_p} e^{-i\omega_p t} \begin{pmatrix} A_x'(z)e^{i\beta_{px} z} \\ A_y'(z)e^{i\beta_{py} z} \end{pmatrix} \quad (1)$$

$$E_p''(r,\theta,z,t) = \frac{\psi_p(r,\theta)}{N_p} e^{-i\omega_p t} \begin{pmatrix} A_x''(z)e^{i\beta_{px}(L-z)} \\ A_y''(z)e^{i\beta_{py}(L-z)} \end{pmatrix} \quad (2)$$

$$E_s'(r,\theta,z,t) = \frac{\psi_s(r,\theta)}{N_s} e^{-i\omega_s t} \begin{pmatrix} B_x'(z)e^{i\beta_{sx} z} \\ B_y'(z)e^{i\beta_{sy} z} \end{pmatrix} \quad (3)$$

$$E_s''(r,\theta,z,t) = \frac{\psi_s(r,\theta)}{N_s} e^{-i\omega_s t} \begin{pmatrix} B_x''(z)e^{i\beta_{sx}(L-z)} \\ B_y''(z)e^{i\beta_{sy}(L-z)} \end{pmatrix} \quad (4)$$

with:

x, y: fiber slow and fast birefringence axis,
L: fiber length,
$\beta_p'$, $\beta_s'$ (;=x,y): pump and signal propagation constants,
$A_l$, $B_l$ (l=x,y): pump and signal field amplitudes,
$\psi_j(r,\theta)$ (j=p,s): pump and signal transverse mode envelopes,
$N_j$ (j=p,s): Normalization factors [11]:

$$N_j = \left( \frac{cn_j}{8\pi} \int_\Sigma \psi_j^2(r,\theta) r dr d\theta \right)^{\frac{1}{2}},$$

$n_j$(jp32 p,s): refractive index at frequency $\omega_j$.

The pump and signal optical powers are equal to $P_p' = |A_x'|^2 + |A_y'|^2$, $P_p'' = |A_x''|^2 + |A_y''|^2$ and $P_x'|^2 + B_x'|^2 + |P_s''| = |B_x''|^2 + |B_y^\Delta|^2$.

In the plane-wave approximation, Maxwell equations reduce for the signal field E, to:

$$\frac{\partial^2 E_s}{\partial z^2} - \frac{n_s^2}{c^2} \frac{\partial^2 E_s}{\partial t^2} = \mu_0 \frac{\partial^2 P_{NL}(\omega_s)}{\partial t^2} \quad (5)$$

$P_{NL}'(\omega_s)$ is the nonlinear polarization oscillating at frequency $\omega_s$. In the approximation where polarized Raman scattering dominates and using the real fields $(E_j + E_j^*)/2$ (j=p,s,), the nonlinear polarization takes the form [11,12]:

$$P_{NL}(\omega_s) = (4\pi\epsilon_0) 4\chi_R^{(3)} \frac{3}{2} E_p(E_p^* \cdot E_s) + c.c. \quad (6)$$

where $\chi_R^{(3)} = [\chi_R^{(3)}]_{1111}$ is the (1111) component of the third-order, resonant nonlinear susceptibility characteristic of Raman scattering. The factor 4 in front of $\chi_R^{(3)}$ in eq. (6) follows the convention of Ref. [11]; the factor 3 comes from degeneracy in field products. Replacing eqs. (1)-(4) into eq.(6), and using the slowly varying envelope approximation, the following propagation equations for the forward and the backward signal complex amplitudes $B' = (B_z', B_y')$, $B'' = (B_z'', B_y'')$ can be obtained (see appendix):

$$\frac{dB'(z)}{dz} = \left( \frac{g_r}{2A_{fps}} \hat{\Gamma}^+(z) - \frac{\alpha_s}{2} \hat{I} \right) B'(z) \quad (7)$$

$$\frac{dB''(z)}{dz} = - \left( \frac{g_r}{2A_{fps}} \hat{\Gamma}^-(z) - \frac{\alpha_s}{2} \hat{I} \right) B''(z) \quad (8)$$

$\hat{\Gamma}^+(z)$, $\hat{\Gamma}^-(z)$ are the gain matrices for the forward and the backward travelling signal waves, and $A_{fps}$ an effective interaction area accounting for mode overlap between the pump and the signal fields. In eqs. (7)-(8), the Raman susceptibility $\chi_R^{(3)}$ has been expressed in terms of the polarized Raman gain coefficient $g_r$ [9] through the identity $96\pi^2\omega_s\chi^{(3)}/n_p n_s c^2 = -ig_r/2$. The factor $-i$ accounts for the fact that in the case of Raman scattering, the third-order nonlinear susceptibility $\chi_R^{(3)}$ is negative and imaginary [13]. The term $\alpha_s \hat{I}/2$ where $\hat{I}$ is the identify matrix and $\alpha_s/2$ the signal field attenuation coefficient has been introduced in order to account for propagation loss. It is assumed that the Raman gain coefficient is independent of the relative propagation directions of the pump and the signal waves, which is accepted as being a good approximation [14].

As seen in the appendix, the coefficients of matrix $\hat{\Gamma}^+(z)$, $\hat{\Gamma}^-(z)$ contain terms having various phase mismatchs (eqs.(A2)-(A4),(A10)-(A12)), generated by the different field sources in the development in field products (A1) of $P'_{NL}(\omega_s)$. For the forward travelling signal wave, the first two terms in this development correspond to forward and backward Raman scattering, respectively, which are self phase-matched interactions; the last two terms correspond to interactions coupling the counterpropagating pump fields, which are not phase matched processes. For simplicity; we assume the input pump fields $E_p'$, $E_p''$ to be linearly polarized along directions forming angles $\theta_p'$ and $\pi - \theta_p''$ with respect to the slow axis ox, as shown in FIG. 1. It is also assumed that the input fields have the same initial phases at z=0 and z=L, respectively, which can be arbitrarily chosen null. In the base (ox, oy) of the birefringent axis, the pump field amplitudes write $A'(z) = \sqrt{T_p(z)P_0'}(\cos\theta_p', \sin\theta_p')$ and $A''(z) = \sqrt{T_p(L-z)P_0''}(-\cos\theta_p'', \sin\theta_p'')$ with $P_0' = |A_x'(0)|^2 + |A_y'(0)|^2$ and $P_0'' = |A_x''(0)|^2 + |A_y''(0)|^2$ being the forward and backward input powers, respectively. The factor $T_p(x) = \exp(-\alpha_p x)$, where $\alpha_p$ is the pump power attenuation coefficient, accounts for pump propagation loss.

It can be seen from the appendix (cf eqs. (A2)-(A4), (A10)-(A12)) that suppression of the off-diagonal coefficients of $\hat{\Gamma}^+(z)$ and $\hat{\Gamma}^-(z)$ occurs for $\theta_p' = \theta_p'' \equiv \theta_p = 0$ or $\pi/2$, which corresponds to the cases where the input pump fields are linearly polarized along either birefringent axis. Taking arbitrarily the case $\theta_p = 0$ integration of eqs. (7)-(8) from $z=0$ to $z=z\leq L$ and $z=L$ to $z=z\leq L$, respectively, yields:

$$B'(z) = \sqrt{T_s(z)} \begin{pmatrix} \sqrt{G^+(z)} & 0 \\ 0 & 1 \end{pmatrix} B'(0) \equiv \hat{K}^+(z) B'(0) \quad (9)$$

$$B''(z) = \sqrt{T_s(L-z)} \begin{pmatrix} \sqrt{G^-(z)} & 0 \\ 0 & 1 \end{pmatrix} B''(L) \equiv \hat{K}^-(z) B''(L) \quad (10)$$

where $T_s(x) = \exp(-\alpha_s x)$ is the signal fiber transmission. The matrices $\hat{K}^\pm$ define the net Raman gains in the two polarization modes, and $G^\pm$ are the Raman gain factors defined by:

$$G^+(z) = \exp\left\{ \gamma L_f(z) U^+(z) - 2\gamma \frac{\sqrt{T_p(L) P_0' P_0''}}{P_0^{tot}} \frac{\sin(\beta_p^x z)}{\beta_p^x} \cos[\beta_p^x(L-z)] \right\} \quad (11)$$

$$G^-(z) = \exp\left\{ \gamma L_f(L-z) U^-(z) - 2\gamma \frac{\sqrt{T_p(L) P_0' P_0''}}{P_0^{tot}} \frac{\sin[\beta_p^x(L-z)]}{\beta_p^x} \cos(\beta_p^x z) \right\} \quad (12)$$

with $P_0^{tot} = P_0' + P_0''$ being the total input pump power, $L_f(x) = \{1 - T_p(x)\}/\alpha_p$ being an effective interaction length, $U^+(z) = \{P_0' + P_0'' T_p(L-z)\}/P_0^{tot}$, $U^-(z) = \{P_0' T_p(z) + P_0''\}/P_0^{tot}$ and $\gamma = g_r P_0^{tot}/A_{fps}$.

Solutions (9) and (10) show that, in the simple case where the two counterpropagating pump fields are linearly polarized along one of the birefringent axis (i.e. the ox axis in the present example), signal gain occurs only along this direction, as expected. As shown in eqs. (11),(12), the signal field gains $G^\pm(z)$ of the fiber amplifier with bidirectional pumping are made from two contributions. The first is due to the combined effects of forward and backward amplifications; the second is an interference term caused by the generation along the fiber of a signal field with a phase mismatch, which is due to a nonlinear polarization excited by each of the counterpropagating pump fields. In the case of large fiber length L, this last contribution can be considered to be negligible in front of $L_f(L)$, accounting for the $1/\beta_p^{x,y}$ dependence with $\beta_p^{x,y} \approx 10^7$ at near infrared frequencies.

Figure 2:
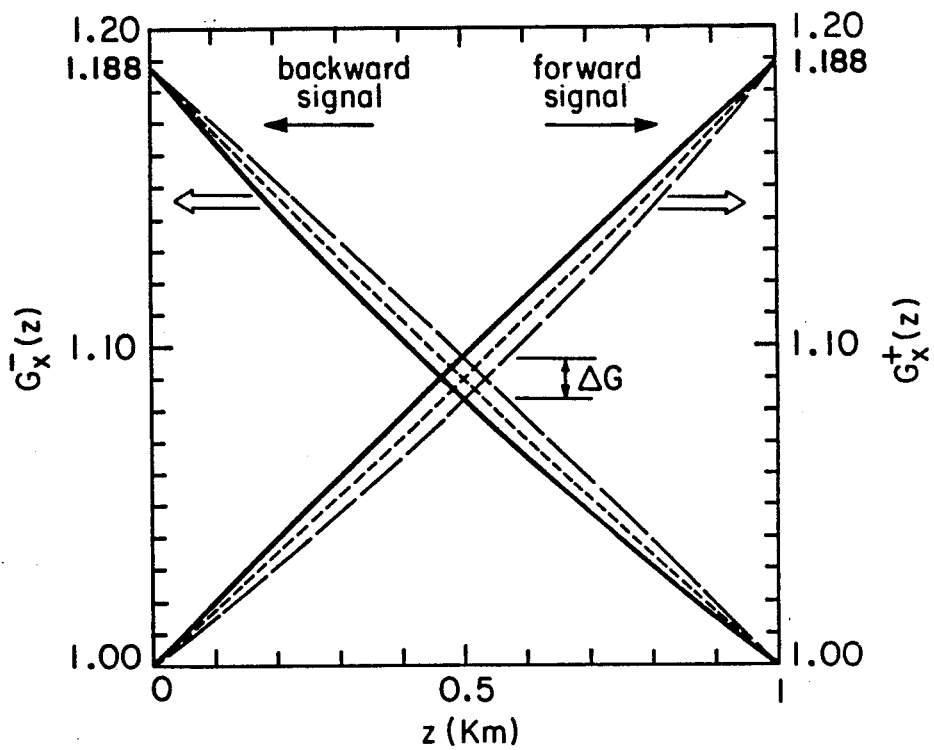
FIG. 2 is a graph illustrating the gain distributions along the fiber for the two counterpropagating signal waves.

It can be checked from eqs. (11)-(12) that, the gains corresponding to the propagation over a length L of fiber are identical in both directions, i.e. $G^+(L) = G^-(0)$, as expected. However, the gain distributions $G^\pm(z)$ along the fiber may not be equal for the two counterpropagating signal waves, depending on the input pump power conditions. FIG. 2 shows plots of $G^+(z)$ and $G^-(z)$ as a function of the fiber longitudinal coordinate z, for different pumping schemes. In this numerical example, the total pump power is chosen so that the field gain $G^+(L) = G^-(0)$ is equal to +0.75 dB. The other parameters are: L=1 km, $\alpha_p = 1.23$ dB/km, $A_{fps} 28.3 \times 10^{-12} m^2$, and $g_r = 13.8 \times 10^{-14}$ m/W which is calculated from ref. [15] for a pump wavelength $\lambda_p = 1.064$ μm. The solid line corresponds to the case $P_0' = P^{tot}$, $P_0'' = 0$, the dashed line corresponds to the case $P_0' = 0$, $P_0'' = P^{tot}$, which is an asymmetrical configuration of unidirectional pumping. The dotted line corresponds to the symetrical pumping case where the input pump powers are identical, i.e. $P_0' = P_0'' = P_0^{tot}/2$.

It can be seen from the figure that in the unidirectional pumping case, the gain distributions verify $G^+(z) \geq G^-(L-z)$, i.e. the signal propagating along with the pump has a gain greater than the signal propagating in the opposite direction. At half the fiber length, the maximum difference is $\Delta G(L/2) = 0.053$ dB in the considered example. This gain nonreciprocity, which has been pointed out in previous study [16], is caused by a difference in effective interaction length in the two propagation directions. In other terms, the integrated gain is greater when the signal propagates with a decaying pump wave than in the opposite case. As a result of this gain discrepancy, if one assumes that two signals of equal power are coupled at both ends of the fiber, the signal which propagates in the same direction as the pump has, at any point in the fiber, a magnitude greater than the counterpropagating signal. Then, through the optical Kerr effect, this nonreciprocity is converted into a non-reciprocal phase shift between the two signal waves (see section I-B), which in the re-entrant gyroscope application results in a rotation rate error (see section I-E). In order to suppress this effect, the symetrical pumping scheme must be employed, for which the integrated gain along the fiber is reciprocal, or independent of the signal propagation direction (eqs. (11)-(12) show that in this case $G^+(z) = G^-(L-z)$).

Raman gain maximization—The input signal field $E_s'$ is assumed to be linearly polarized along a direction forming an angle $\theta_s'$ with respect to the ox birefringence axis (see FIG. 1). The input signal power being $P_s^0$, the input signal field amplitude is then $B'(0) = \sqrt{P_s^0}(\cos\theta_s', \sin\theta_s')$. From eq. (9), the forward signal power gain with the pump polarized along the ox axis can be written as:

$$G(\theta_s')^{40} = T_s\{1 + \cos^2\theta_s'(G-1)\} \quad (13)$$

with $T_s \equiv T_s(L)$ and $G \equiv G^+(L)$, which takes the same form as in ref [15]. Then, the power gain is maximized for $\theta_s' = 0$, i.e. $G_{max} = G(0) = T_s G$, which corresponds to the case where the input signal is linearly polarized in the direction parallel to the pump. In this case the signal polarization is maintained along the whole fiber length, which in addition to gain maximization represents the most advantageous configuration for the reciprocity properties which are required in fiber gyroscope applications.

Time-dependent Raman gain—In the former analysis, the pump field amplitudes have been assumed constant. With actual laser sources, the pump power used for Raman amplification is characterized generally by a certain amount of noise. This feature is of interest, since intensity fluctuations of the pump, causing signal gain fluctuations, result in signal phase noise through the intensity-dependent optical Kerr effect. Thus, if the pump power fluctuations are faster than the transit time of the fiber amplifier, nonreciprocal phase modulation of the counterpropagating signal waves can occur, which is of concern for fiber gyroscope applications. This effect is described in the next section.

For simplicity, only the case of pump waves linearly polarized along the ox birefringence axis is considered. In addition, it is assumed that the input pump waves are coming from the same coherent source, characterized by a low-frequency intensity noise. In this case, the former steady-state approach leading to solutions (7),(8) is still valid, with a time-dependent gain coefficient matrix $\hat{\Gamma}(z,t)$, which only nonzero component has a form similar to (A2):

$$\hat{\Gamma}(z,t) = |A_{x}'(z,t)|^2 + |A_{x}''(z,t)|^2 = T_p(z)P_0'\left(0, t - \frac{z}{V}\right) + T_p(L-z)P_0''\left(L, t - \frac{L-z}{V}\right) \quad (14)$$

In eq. (14), V is the group velocity of the pump wave. The non-phase matched term in eq. (A3), which in the case of long fiber lengths gives a negligible gain contribution, has been neglected.

Solutions of eqs. (7),(8) write at time t:

$$B'(L,t) = \sqrt{T_s} \left( \exp\left\{ \frac{g_r}{2A_{fps}} \int_0^L \hat{\Gamma}_{xx}\left(z', t - \frac{L-z'}{V}\right) dz' \right\} \quad 0 \atop 0 \quad 1 \right) B'(0, t-\tau) \quad (15)$$

$$B''(0,t) = \sqrt{T_s} \left( \exp\left\{ \frac{g_r}{2A_{fps}} \int_0^L \hat{\Gamma}_{xx}\left(z', t - \frac{z'}{V}\right) dz' \right\} \quad 0 \atop 0 \quad 1 \right) B''(L, t-\tau) \quad (16)$$

In eqs. (15),(16) the integrands have been synchronized with the movement of the pump waves. In addition, time dependence of the input signal waves has been introduced, assuming the same group velocity V. Using eq. (14), integration in eqs. (15),(16) yields:

$$B'(L,t) = \quad (17)$$

$$\sqrt{T_s} \left( \sqrt{G^+(z,t)} \quad 0 \atop 0 \quad 1 \right) B'(0, t-\tau) \equiv \hat{K}^+(z,t)B'(0, t-\tau)$$

$$B''(0,t) = \quad (18)$$

$$\sqrt{T_s} \left( \sqrt{G^-(z,t)} \quad 0 \atop 0 \quad 1 \right) B''(L, t-\tau) \equiv \hat{K}^-(z,t)B''(L, t-\tau)$$

with $\tau = L/V$ and:

$$G^+(L,t) = \exp\left\{ \frac{g_r}{A_{fps}} P_0'(0, t-\tau)L_f(L) + \langle T_p\left[\frac{V}{2}(t-t')\right]P_0''(L,t') \rangle_{2\tau L} \right\} \quad (19)$$

$$G^-(0,t) = \exp\left\{ \frac{g_r}{A_{fps}} P_0''(L, t-\tau)L_f(L) + \langle T_p\left[\frac{V}{2}(t-t')\right]P_0'(0,t') \rangle_{2\tau L} \right\} \quad (20)$$

with the angle bracket $\langle \rangle_T$ indicating time average over duration T from time $t-2r$ to time $t-2r+T$. The above results are used in the next section for evaluating the magnitude of the optical Kerr effect in presence of of pump power fluctuations.

I-B. Optical Kerr effect in bidirectional fiber Raman amplifier

In this section, the optical Kerr effect (OKE), or intensity-dependent modulation of the signal refractive index, is analyzed in the case of a fiber medium where Raman amplification occurs. In the case of a bidirectional fiber Raman amplifier, the analysis of such an effect is made complicated by the concurrent interaction in the fiber medium of four waves (two counterpropagating pump and signal waves), each of which are divided into two guided polarization modes. Such a complex eight-wave mixing interaction involves two nonlinear effects which are coupled together: while Raman scattering results in the modulation of signal amplitudes, the OKE results in an amplitude-sensitive modulation of signal phases. It is shown in the following analysis that a nonreciprocal phase modulation induced by OKE occurs when the two pump waves and/or the two signal waves do not have the same magnitudes. As it is shown thereafter (section I-E), this nonreciprocity imposes a limitation on the reentrant fiber gyroscope performance.

With bidirectional pump and signal waves, the OKE induced on the signal waves is the result of three distinct processes: (a) the pump wave interaction with the two signal waves (pump-induced OKE), (b) the individual signal waves interaction with themselves (self-OKE), and (c) the two signal waves interactions with each other (cross OKE). These three contributions to the OKE are evaluated in terms of accumulated phase difference between the two signal waves.

Since Raman scattering is essentially a phase-interaction (if coupling with an anti-Stokes wave [11] is neglected), the OKE-induced phase modulation does not affect the process of signal amplification. Therefore, the time-dependent solutions obtained in section I-A for the amplitudes of the amplified signals apply also in the case where the OKE occurs. In the following, the intensity-dependent signal phase modulation due to OKE is calculated from these solutions.

Considering the total fields $E_p(z,t)$ and $E_s(z,t)$ of coordinates $E_p^j(z,t)$ and $E_s^j(z,t)$, respectively (j=z,y), the nonlinear polarization of the medium can be expressed from [17] as:

$$P_i^{NL}(\omega_s, z, t) = (4\pi\epsilon_0)4[\chi_K^{(3)}]_{ijkl}\left(\frac{3}{8}E_s^j(z,t)E_s^{*k}(z,t)E_s^l(z,t) + \right. \quad (21)$$

-continued $$\frac{6}{8} E_p{}^j(z,t)E_p^{*k}(z,t)E_s{}^l(z,t) \Bigg)$$

where $\chi^{(3)}$ is the third-order nonlinear susceptibility tensor responsible for Kerr effect, which far from resonances, has real and wavelength-independent coefficients, mostly of electronic origin [11]. Because of the Kramer-Kronigs relations, Raman scattering contributes for a structure in the real part of the nonlinear susceptibility due to the resonance of the imaginary part [18]. However, it can be shown [18] that this contribution is null at the resonant frequency $\omega_s = \omega_p - \omega_R$ which is chosen for the signal for gain coefficient maximization [9]. It is assumed that in the case of a birefringent fiber, which have a small birefringence (i.e. $\delta_n \approx 10^{-5}$), the optical nonlinearities are similar to the ones characterizing the case of an isotropic medium. In such a case, a well-known feature is that the susceptibility tensor $\chi^{(3)}$ has only three independent and nonzero components [17], usually designed by $\chi_{1122}$, $\chi_{1221}$ and $\chi_{1212}$, with the relation $\chi_{1111} = \chi_{1122} + \chi_{1221} + \chi_{1212}$.

Keeping in the development (21) of the nonlinear polarization only the terms which are phase-matched, assuming that the pump field is linearly polarized along the ox birefringence axis (i.e. $E_p{}^y = 0$), using the eqs. (5),(17),(18), it is found for the field amplitudes (see appendix):

$$B'(L,t) = \exp\left( i \int_0^L \hat{\phi}^+(z',t)dz' \right) B'(0,t-\tau) \quad (22)$$

$$B''(0,t) = \exp\left( -i \int_L^0 \hat{\phi}^-(z')dz' \right) B''(L,t-\tau) \quad (23)$$

with $\hat{\phi}^\pm(z)$ being diagonal matrices whose elements describe all the phase-matched OKE interactions between the counterpropagating pump and signal fields. Since the elements of $\hat{\phi}^\pm$ contain only terms in $|A_x|^2$, $|B_j'|^2$ and $|B_j''|^2$ which are phase-independent, they can be calculated from the solutions obtained in analysis of SRS. Combining eqs. (17),(18) with (22),(23), the general solutions, describing the concurrent signal amplitude and phase modulations by Raman and Kerr effects, take the form:

$$B'(L,t) = \hat{K}^+(L,t)\exp\{i\hat{\Phi}_K^+(L,t)\}B'(0,t-\tau) \quad (24)$$

$$B''(0,t) = \hat{K}^-(0,t)\exp\{\hat{\Phi}_K^-(b\,0,t)\}B''(L,t-\tau) \quad (25)$$

where the matrices $\hat{\Phi}_h^\pm$ are defined by the integrals in eqs. (22),(23).

The input pump waves are assumed to come from the same pump laser source and to be synchronized at $z=0$ and $z=L$. This can be expressed by the following input conditions:

$$P_0'(0,t) = \gamma_p \eta_p P_p^{in}(t) \quad (26)$$

$$P_0''(L,t) = \gamma_p(1-\eta_p)P_p^{in}(t) \quad (27)$$

where $\eta_p$ is a power splitting ratio and $\gamma_p$ is a coupling efficiency using eqs. (26),(27) and the assumption that the signal waves are confined into short optical pulses of duration $\tau_s < \tau$, the phase difference $\Delta\hat{\Phi}_K(t) = \hat{\Phi}_K^+(t) - \hat{\Phi}_K^-(t)$ between the counterpropagating signal waves after propagation through the fiber amplifier can be expressed as (see appendix):

$$\Delta\hat{\Phi}_K(t) = \Delta\hat{\Phi}_{PK}(t) + \Delta\hat{\Phi}_{SK}(t) + \Delta\hat{\Phi}_{CK}(t) \quad (28)$$

with:

$$\Delta\hat{\Phi}_{PK}(t) = \hat{\Phi}_{PK}^+(t) - \hat{\Phi}_{PK}^-(t) = \quad (29)$$

$$\gamma_p(2\eta_p - 1)C_p \begin{pmatrix} \chi_{1111} & 0 \\ 0 & \chi_{1221} \end{pmatrix}$$

$$\left\{ P_p^{in}(t-\tau)L_{fp} - <T_p\left[\frac{V}{2}(t-t')\right]P_p^{in}(t')> 2\tau L \right\}$$

$$\Delta\hat{\Phi}_{SK}(t) = \hat{\Phi}_{SK}^+(t) - \hat{\Phi}_{SK}^-(t) = \quad (30)$$

$$C_s\begin{pmatrix}\chi_{1111} & 0 \\ 0 & \chi_{2211}+\chi_{2112}\end{pmatrix}L_x(t) + C_s\begin{pmatrix}\chi_{1122}+\chi_{1221} & 0 \\ 0 & \chi_{2222}\end{pmatrix}L_y(t)$$

$$\Delta\hat{\Phi}_{CK}(t) = \hat{\Phi}_{CK}^+(t) - \hat{\Phi}_{CK}^-(t) = \quad (31)$$

$$-C_s\begin{pmatrix}2\chi_{1111} & 0 \\ 0 & \chi_{2211}+\chi_{2112}\end{pmatrix}M_x(t) -$$

$$C_s\begin{pmatrix}\chi_{1122}+\chi_{1221} & 0 \\ 0 & 2\chi_{2222}\end{pmatrix}M_y(t)$$

with $L_{z,y}(t) = I_{z,y}{}^+(t) - I_{z,y}{}^-(t)$ and $M_{z,y}(t) = J_{z,y}{}^+(t) - J_{z,y}{}^-(t)$, whose expressions are detailed in the appendix. The matrices $\Delta\hat{\Phi}_{PK}$, $\Delta\hat{\Phi}_{SK}$, and $\Delta\hat{\Phi}_{CK}$ define the difference in phase shifts induced in the two polarization modes between the counterpropagating signals by the pump-OKE, the self-OKE and the cross-OKE, respectively.

When the pump power $P_p^{in}$ is a constant function of time, or when its fluctuations about a constant value $P_p^{in}$ are slow compared to $2\tau$, the expressions defining $\Delta\hat{\Phi}_K$ simplify and it is obtained from the appendix:

$$[\Delta\hat{\Phi}_{PK}]_{xx} = [\Delta\hat{\Phi}_{PK}]_{yy} = 0 \quad (32)$$

$$L_x(t) \approx \frac{K-1}{\ln(K)} L_{fs}\{P_{sx}^+(t-\tau) - P_{sx}^-(t-\tau)\} \quad (33)$$

$$L_y(t) = L_{fs}\{P_{sy}^+(t-\tau) - P_{sy}^-(t-\tau)\} \quad (34)$$

$$M_x(t) \approx V\tau_s\sqrt{T_s}\, e^U \{P_{sx}^+(t-\tau)e^W - P_{sx}^-(t-\tau)e^{-W}\} \quad (35)$$

$$M_y(t) = V\tau_s\sqrt{T_s}\,\{P_{sy}^+(t-\tau) - P_{sy}^-(t-\tau)\} \quad (36)$$

with $g = \gamma_p g_r P_p^{in} L_{fp}(L/2)/A_{fps}$, $U = g(1-\alpha_p L/4)$, $W = g\alpha_p L(2\eta_p - 1)/4$, $L_{fq}(x) = (1-T_q(x))/\alpha_q$ (q=p,s), $P_{sx,y}{}^+(t-\tau) \equiv |B'_{x,y}(0,t-\tau)|^2$ and $P_{sx,y}{}^-(t-\tau) \equiv |B''_{x,y}(L,t-\tau)|^2$. In expressions (33),(35), the approximation of low pump power attenuation, i.e. $T_p(z) \approx 1 - \alpha_p z$, has been used. For the self-OKE, this approximation is equivalent to neglecting the Raman gain nonreciprocity discussed in section I-A.

The above results show that when the pump power is constant (or when its fluctuations about a constant value are slow compared to the time $2\tau$), (a) the pump-induced OKE is reciprocal with respect to the counterpropagating signal waves, i.e. $\Delta\hat{\Phi}_{PK}=0$ (eqs. (29),(32)), and (b) the signal-induced OKE (self and cross OKE) is not reciprocal when the input pump powers and/or the input signal powers in both propagation directions are not identical, i.e. when $\eta_p \neq 0.5$ and/or $P_{sx,y}^+ - P_{sx,y}^- \neq 0$ (eqs. (30),(31),(33)–(36)).

The first result could have been obtained intuitively: the pump-induced phase modulation due to OKE is proportional to the integral of the pump power distribution along the fiber, and therefore does not depend on the signal propagation directions. On the other hand, the phase modulation induced by the two signals are proportional to the integral of the signal power distributions along the fiber. Since in the case of an asymetrical pumping the gain distributions are not equal, as seen in section I-A, the resulting modulational effects due to self-OKE and cross-OKE are not reciprocal (or $M_x(t)$ and $L_x(t) \neq 0$ as seen in eqs. (A49) and (A50)). In the case of low pump power attenuation, the self-OKE difference depends only on the input signal powers, as seen in eq. (33). In the case where the two input signal powers are of equal magnitude, the overall signal-induced OKE (self-OKE and cross-OKE) results eventually in a nonreciprocal phase modulation. In any case, the nonreciprocal phase modulation is minimized when the pump power is equally divided into the two propagation directions, i.e. $\eta_p = 0.5$, which corresponds to a symetrical pumping scheme, and vanishes when the two input signal powers have the same magnitudes.

I-C. Stokes noise and Rayleigh backscattering

In this section, the magnitude of two major contributions to the signal output noise is evaluated. These have for origin (a) the secondary waves initiated by spontaneous Raman scattering, and (b) the secondary waves generated from backward Rayleigh scattering (the forward Rayleigh scattered waves are assumed to recombine coherently with their generating signal waves). As they propagate through the Raman gain medium, the two secondary waves are amplified. In the case of low gains and short signal pulses, their amplitudes are expected to be actually very small. However, if the fiber is closed upon itself to form a reentrant fiber loop with a unity net gain, the small amount of noise generated by SRS and BRS recirculate without propagation loss, while each recirculation contribute to an additional amount. As a result, this noise background builds up proportionally to the number of recirculations, causing the signal-to-noise ratio to decay accordingly. The SNR performance of the active reentrant fiber gyroscope, which is based on the principle of an active reentrant fiber loop, is analyzed in section I-E from the results obtained in this section.

Stokes noise—As a pump wave propagates in the fiber medium, secondary waves initiated from amplified spontaneous Raman scattering (ASS), or Stokes waves, are generated in both forward and backward directions, with a broad spectrum centered on the signal wavelength. With bidirectional pumping, each pump wave generates a pair of counterpropagating Stokes waves. Then, there is in each propagation direction a pair of Stokes waves, each being generated by one of the two pump waves, which propagates along with one of the two signals. Because of stimulated scattering process, these Stokes waves pairs have the same phases as the copropagating signal waves, during the time they overlap together, and some unpredictable phases anywhereelse. Although the Stokes wave pair which propagates with one signal wave adds coherently with it, it has a photon statistics different from the signal. As a result, a certain amount of intensity noise (shot and beat noises) is generated by this superposition, which results in a corresponding decay of the output SNR.

It has been shown in section I-A that in the case of an asymetrical pumping the gain distributions corresponding to the two propagation directions are slightly different. As shown below, the Stokes output is proportional to the integral of this gain distribution. Then, in the asymetrical pumping case, the SNR is not strictly the same for each propagation direction. In the following analysis, the variance of the total output signal (amplified signal, Stokes noise and amplified Rayleigh backscattered noise) is calculated in the two propagation directions, considering only one polarization mode. The results are used thereafter (section I-E) for the evaluation of the output SNR in the reentrant fiber gyroscope application.

In order to derive expressions for the ASS variance, a quantum model [19,20] describing the statistical evolution of the Stokes photon number can be used, within an undepleted pump approximation. In previous study [16], such a model has been used for analysing the case of an unidirectional pumping scheme. Following a similar approach, the mean and mean-square photon numbers $<n_\pm(z)>, <n_\pm^2(z)>$ at coordinate $z$, corresponding to the sum $n_\pm(z)$ of the signal and the Stokes photon numbers in the two propagation directions, verify the photon-rate equations:

$$\frac{d<n_\pm(z)>}{dz} = \pm\{\gamma(z)[<n_\pm(z)> + 1] - \alpha_s<n_\pm(z)>\} \quad (37)$$

$$\frac{d<n_\pm^2(z)>}{dz} = \pm\{[2\gamma(z) - \alpha_s]<n_\pm^2(z)> + [3\gamma(z) + \alpha_s]<n_\pm(z)> + \gamma(z)\} \quad (38)$$

In the bidirectional pumping case, the gain coefficient $\gamma(z)$ in eqs. (37),(38) is related to the mean input pump photon numbers $<n_p^0>$ and $<n_p(L)>$ through:

$$\gamma(z)=\gamma_0\{<n_p(0)>T_p(z)+<n_p(L)>T_p(L-z)\} \quad (39)$$

Solution of eq. (37) writes:

$$<n_\pm(z)>=K^\pm(z)<n_\pm^0>+N^\pm(z) \quad (40)$$

with $<n_+^0>=<n_s(0)>$ and $<n_-^0>=<n_s(L)>$ being the mean input signal photon numbers. The net gains $K^\pm(z)$ in eq. (40) have for respective expressions:

$$K^+(z)=\exp[\gamma_0\{<n_p(0)>+<n_p(L)>T_p(L-z)\}L_f(z)-\alpha_s z] \quad (41)$$

$$K^-(z)=\exp[\gamma_0\{<n_p(1)>T_p(z)+<n_p(L)>\}L_f(L-z)-\alpha_s(L-z)] \quad (42)$$

The net gains $K^\pm(z)$ in eqs.(41), (42) are identical to the gains obtained through the Maxwell formation approach of section I-A (eqs.(9)–(12)), except for the small correction due to non phase-matched interactions. In eq. (40), the terms $N^\pm(z)$, representing the Stokes noise outputs, have for respective expressions:

$$N^+(z) = K^+(z) \int_0^z \frac{\gamma(z')}{K^+(z')} dz' \quad (43)$$

$$N^-(z) = K^-(z) \int_z^L \frac{\gamma(z')}{K^-(z')} dz' \quad (44)$$

The solutions of eq.(38) write:

$$<n_\pm^2(z)> = \quad (45)$$

$$[K^\pm(z)]^2 \left( <[n_\pm^0]^2> + \int \frac{[3\gamma(z') + \alpha_s]<n_\pm(z')> + \gamma(z')}{[K^\pm(z')]^2} dz' \right)$$

Due to the complicated dependence with z of the functions $\gamma(z)$ and $G^\pm(z)$ involved in the integrands in eqs.(43)–(45), the quantities $N^\pm(z)$ and $<n_\pm^2(z)>$ cannot be evaluated in a straightforward calculation, except in the case of an unidirectional pumping (i.e. $<n_p(1)>=0$ or $<n_p(L)>=0$), which has been treated in [16]. However, considering that in practice the pump power attenuation responsible for the gain distribution asymmetry is small, the solutions corresponding to the bidirectional fiber Raman amplifier must be similar to the ones corresponding to the unidirectional case. With this assumption, the output variance $\sigma_\pm^2$ of the bidirectional fiber Raman amplifier must take a form identical to that of [16]:

$$\sigma_\pm^2 = K^2([\sigma_0^\pm]^2 - <n_\pm^0>) + (K<n_\pm^0> + N^\pm)$$
$$+ \{2KN^\pm<n_\pm^0> + [N^\pm]^2\} \quad (46)$$

with $K \equiv K^+(L) = K^-(0)$, $N^+ = N^+(L)$, $N^- = N^-(0)$. In eq. (46), the terms $\sigma_{0\pm}^2$ represent the variances of the input signals, and the three terms in the right-hand side represent the excess noise, the shot noise and the beat noise contributions, respectively.

Backward Rayleigh scattering—As mentioned previously, Rayleigh scattering initiated from the primary signal waves contributes also to the generation of secondary waves. At the origin of these secondary waves, a very small amount of the scattered signal fields is recaptured by the optical waveguide in both propagation directions, and is amplified as it propagates along the fiber. In the case of forward Rayleigh scattering, one can assume that the recaptured field has the same phase as the signal source and therefore recombined coherently without causing interferences. Furthermore, it is believed that forward Rayleigh scattering has a reciprocal effect with respect to the two primary signal waves [21]. On the other hand, the coherent secondary waves generated by backward Rayleigh scattering (BRS) from the primary signal waves, have unpredictable phases which are different in the two propagation directions [21]. The portion of the backward secondary waves which interfere with the signal waves is the one which has been generated at the half fiber length, when the two counterpropagating signal pulses do overlap.

Following the quantum statistics theory in [19], the rate equations for the mean photon numbers $<n_R^\pm(z)>$ generated by BRS in presence of Raman gain write:

$$\frac{d<n_R^\pm(z)>}{dz} = \pm\{[\gamma(z) - \alpha_s]<n_R^\pm(z)> + c^\pm(z)\} \quad (47)$$

The factor $\gamma(z) - \alpha_s$ in eq. (47) accounts for stimulated Raman gain and propagation loss. The factor $c^\pm(z)$ is the rate at which protons are generated by BRS from the primary signal photon population $<n_\pm(z)>$. At the wavelengths of interest (i.e. $\lambda \approx 1$ μm to 1.6 μm), and assuming an optical fiber free from $OH^-$ ions, the loss mechanism is essentially dominated by Rayleigh scattering [22]. Then, the creation rate of backscattered photons can be approximated by $c^\pm(z) = \alpha_s B <n_\mp(z)>$, where $B = (N.A./2)^2$, with N.A. being the fiber numerical aperture, is the recapture factor [21]. Assuming that the signals are square pulses with short duration $\tau_s$, the portion of interest BSR-generated waves occurs around the middle of the fiber length, in the region defined by $z \epsilon [L/2 \pm V\tau_s/2, L/2 \mp V\tau_s/2]$. Neglecting the Raman gain dependence with z is this small region, the solutions $<n_R^\mp>$ of eq. (47) at $z=0$ and $z=L$ take the form:

$$<n_R^\pm> = bK_{\frac{1}{2}}^\mp\{K_{\frac{1}{2}}^\mp<n_0^\pm> + N_{\frac{1}{2}}^\pm\} \quad (48)$$

with $b = \alpha_s BV\tau_s/2$, $K_{\frac{1}{2}}^\mp \equiv K^\mp(L/2)$ and $N_{\frac{1}{2}}^\mp \equiv N^\mp(L/2)$.

We consider now the case of a fiber loop closed upon itself by means of a directional fiber coupler, or so-called re-entrant fiber loop [23]. If the fiber coupler has a power coupling ratio $\eta$ and a power transmission $\gamma$, a fraction $\eta\gamma$ of all signal coming from within the loop and reaching the fiber coupler is recoupled into the loop, while the other fraction $\gamma(1-\eta)$ is tapped out from it. Then the fraction of signal which is recoupled into the loop can recirculate around it many times. In the following, the mean value and the variance of the total signal which is re-coupled into the fiber loop are evaluated, in the case where the net loop Raman gain K compensates exactly for the loss due to the coupler crossings, i.e. $K\eta\gamma = 1$. The total mean photo number $<n_{(n)}^\pm>$, composed by the amplified signal, the Stokes noise and the Rayleigh-backscattered noise, which re-enters the fiber loop after having achieved n recirculations can be expressed from eqs. (40) and (48) through a matrix form:

$$\begin{pmatrix} <n_{(n)}^+> \\ <n_{(n)}^-> \end{pmatrix} = \begin{pmatrix} 1 & \epsilon^- \\ \epsilon^+ & 1 \end{pmatrix} \begin{pmatrix} <n_{(n-1)}^+> \\ <n_{(n-1)}^-> \end{pmatrix} + \begin{pmatrix} \alpha^+ \\ \alpha^- \end{pmatrix} \quad (49)$$

with $\epsilon^\pm = b[K_{\frac{1}{2}}^\pm]^2/K$, $\alpha^\pm = (N^\pm + bK_{\frac{1}{2}}^\mp N_{\frac{1}{2}}^\mp)/K$. By iterating eq. (49) and neglecting the terms in $(\epsilon^\pm\epsilon^\pm)^n$ for $n \geq 2$, an explicit expression is obtained for $<n_{(n)}^\pm>$:

$$<n_{(n)}^\pm> \approx <n_{(o)}^\pm> + n(\alpha^\pm + \epsilon^\mp <n_{(o)}^\mp>) + \quad (50)$$

$$\frac{n(n-1)}{2} \epsilon^\mp \left( \frac{N^\mp}{K} + \epsilon^\pm <n_{(o)}^\pm> \right)$$

The statistical variance $[\sigma_{(n)}^\pm]^2$ of the total photon number reentering the loop after n recirculations is given by [16]:

$$[\sigma_{(n)}^\pm]^2 = \eta^2\gamma^2[\sigma_{(n)\pm}']^2 + \eta\gamma(1-\eta\gamma)<n'_{(n)\pm}> \quad (51)$$

In eq. (51), $<n'_{(n)\pm}>$ and $[\sigma_{(n)\pm}']^2$ represent the mean and the variance of the photon population located in the loop just before the coupler. The statistical process consisting in crossing the coupler with probability $\eta\gamma$ introduces noise [16], which is expressed in eq. (51) by the additional variance which is proportional to the mean value $<n'_{(n)\pm}>$. The two quantities $<n'_{(n)\pm}>$ and $[\sigma'_{(n)}\pm]^2$ can be calculated by using the results of eqs. (40) and (46), which apply to a length L of fiber, and iterating eq. (51), with $\eta\gamma = 1/K$. However, one has to assume that, in addition to the propagation of the excess, shot and beat noises predicted by the previous analysis, some noise is also generated during each individual recirculation by the beating effect of the Rayleigh backscattered photons with the overall recirculating signal. This additional noise contribution can be put under the form:

$$[\sigma_{(n)}\pm,\text{Rayleigh}]^2 = 2K_{\frac{1}{2}}^{\mp}(K_{\frac{1}{2}}^{\mp}<n_{(-1)}\pm> \\ +N_{\frac{1}{2}}^{\pm}).bK_{\frac{1}{2}}^{\mp}(K_{\frac{1}{2}}^{\mp}<n_{(n-1)}^{\mp}>+N_{\frac{1}{2}}^{\mp} \\ +2N_{\frac{1}{2}}^{\pm}.bK_{\frac{1}{2}}^{\mp}(K_{\frac{1}{2}}^{\mp}<n_{(n-1)}^{\mp}>+N_{\frac{1}{2}}^{\mp}) \tag{52}$$

The first item in the right-hand side of eq. (52) corresponds to the accumulated beat noises, generated in a half recirculation, which occurs between the total recirculating signal and the overall Rayleigh-backscattered signal propagating in the same direction. The second term in eq. (52) represents the beat noise occuring between the total recirculating signal and the Rayleigh-backscattered Stokes noise which is generated during a half recirculation.

Using eqs. (46), (50), (52) and iterating eq. (51), an explicit expression can be found for the overall variance $[\sigma_{(n)}\pm]^2$:

$$[\sigma_{(n)}^{\pm}]^2 = [\sigma_{(0)}^{\pm}]^2 + \frac{K-1}{K}(<n_{(n)}^{\pm}> - <n_{(0)}^{\pm}>) + n\left[\frac{N^{\pm}(N^{\pm}+1)}{K^2} + C_1^{\pm}\right] + \tag{53}$$

$$\sum_{k=0}^{n-1}\left\{\left(\frac{2N^{\pm}}{K} + C_2^{\pm}\right)<n_{(k)}^{\pm}> + C_3^{\pm}<n_{(k)}^{\mp}> + C_4^{\pm}<n_{(k)}^{\pm}><n_{(k)}^{\mp}>\right\}$$

where the coefficients $C_i (i=1\ldots 4)$ are proportional to b and powers of K, $K_{\frac{1}{2}}^{\pm}$ and $N_{\frac{1}{2}}^{\pm}$. Given the development (5D) of $<n_{(n)}^{\pm}>$, the sum in eq.(53) is a polynom in n of degree 5. If one considers value of $10^{-12}$ and $10^{-7}$ for the parameters b and $<n_{(0)}^{\pm}>$, and numbers of recirculations $n \geq 10^7$ (which is justified a posteriori in the numerical applications considered in section I-E), the total variance in eq. (53) can be expressed, after calculating the sum and keeping the terms of greatest magnitude, as:

$$[\sigma_{(n)}^{\pm}]^2 \approx \left\{[\sigma_{(0)}^{\pm}]^2 + n\frac{N^{\pm}}{K}(1 + 2<n_{(0)}^{\pm}>) + n\frac{N^{\pm}}{K}\right\} + \tag{54}$$

$$\epsilon^{\mp}\left\{2n<n_{(0)}^{\pm}><n_{(0)}^{\mp}> + \frac{n^2}{K}(<n_{(0)}^{\pm}>N^{\mp} + <n_{(0)}^{\mp}>N^{\pm}) + n^3\frac{1+2K}{3K^2}N^+N^-\right\}$$

The first group of terms between braces in eq. (54) corresponds to the noise variance due to the amplification of the signal and the spontaneous Raman scattering, which has been analyzed in previous work [16]. The second group of terms represents the additional noise introduced by the amplified BRS. In this second group, the successive terms represent the beat noises between (1) the signals and their Rayleigh backscattered counterparts, (2) the signals and the Rayleigh-backscattered Stokes noises, and (3) the Stokes noises and their Rayleigh-backscattered counterparts. This result is used in section I-E for evaluating the re-entrant gyroscope output SNR.

I-D. Reentrant fiber Raman gyroscope

Figure 3:
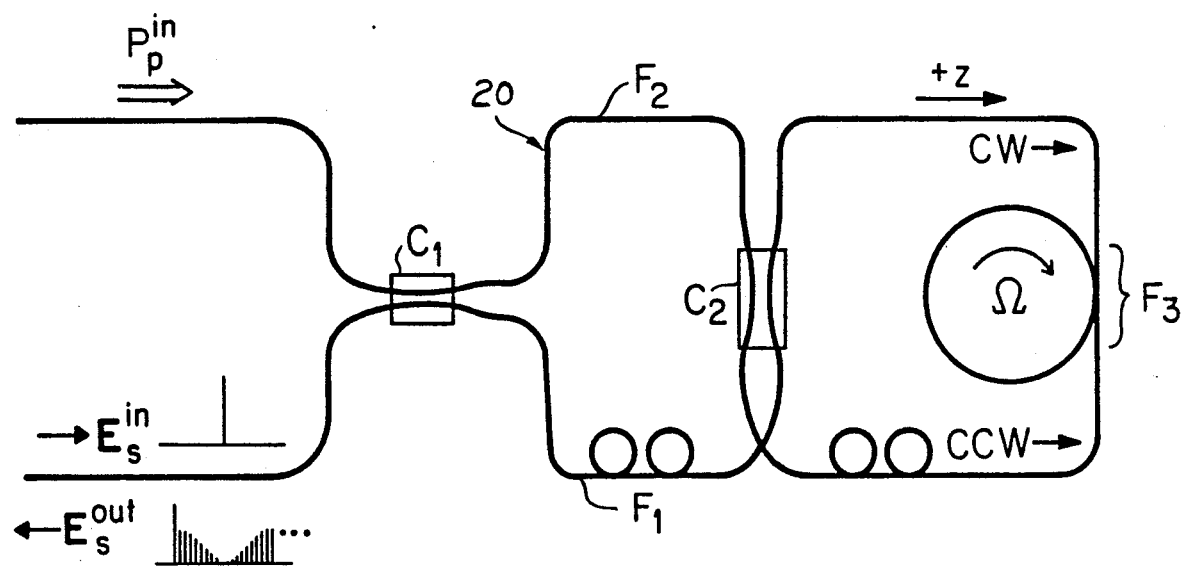
FIG. 3 is a simplified schematic drawing of a preferred embodiment of the invention.

The reentrant fiber gyroscope is made from a strand of fiber (2c) closed upon itself with two directional fiber couplers ($C_1, C_2$) as shown in FIG. 3. The different portions of such a fiber system can be described advantageously through the scattering matrix formalism [24].

The first coupler ($C_1$) is used as a beam splitter for the input signal $E_s^{in}$, and as a combiner for the waves reflected from the system (in the following, it is referred to as the BS/C coupler). The input signal is an optical pulse with duration $\Delta T$ shorter than the reentrant loop transit time $T_{loop}$. The two optical pulses generated by the signal splitting in the first coupler propagate along short fiber paths ($F_1$) and ($F_2$), respectively, and are coupled in opposite propagation directions into the reentrant loop, forming the sensing coil, through the second fiber coupler $C_2$. After having circulated along the loop ($F_3$), a fraction of the two counterpropagating pulses is tapped by the coupler ($C_2$) and returns to the coupler $C_1$. The other fraction is coupled again into the loop and recirculates around it. As a result, the reflected signal $E_s^{out}$ returning to the same fiber end as the input signal is a train of optical pulses with time separation $T_{loop}$ (if one neglects the transit times in the short leads $F_1$ and $F_2$). Each of these pulses with electric field component $E_s^{out,(n)}$ corresponds to the recombination of the pair of counterpropagating signal pulses having recirculated n times into the sensing loop.

Following notations similar to that of [24], as applied to the geometry of the reentrant fiber gyroscope, we obtain, with n being the number of signal recirculations ($n \leq 1$):

$$E_s^{out,(n)} = \hat{R}_n E_s^{in} \tag{55}$$

where $\hat{R}_n$ is the scattering matrix of the system operated in reflection, $$\hat{R}_n = \frac{1}{2}(\vec{M}_n e^{in\phi_s} + \overleftarrow{M}_n e^{-in\phi_s}) \tag{56}$$

where $2\phi_s$ is the nonreciprocal Sagnac phase shift due to the rotation of the sensing loop, and:

$$\vec{M}_n = \vec{C}_{1\otimes}\vec{F}_2\vec{C}_{2\ominus}\vec{F}_3\vec{L}^{n-1}\vec{C}_{2\ominus}\vec{F}_1\vec{C}_{1\ominus} = \vec{C}_{1\otimes}\vec{F}_2\vec{C}_{2\ominus}\\ \vec{C}_{2\otimes}^{-1}\vec{L}^n\vec{C}_{2\ominus}\vec{F}_1\vec{C}_{1\ominus} \tag{57}$$

$$\overleftarrow{M}_n = \overleftarrow{C}_{1\ominus}\vec{F}_1\vec{C}_{2\ominus}\overleftarrow{L}^{n-1}\vec{F}_3\vec{C}_{2\ominus}\vec{F}_2\vec{C}_{1\otimes} \\ = \overleftarrow{C}_{1\ominus}\vec{F}_1\vec{C}_{2\ominus}\overleftarrow{L}^n\vec{C}_{2\otimes}^{-1}\vec{C}_{2\ominus}\vec{F}_2\vec{C}_{1\otimes} \tag{58}$$

with the reentrant loop scattering matrices defined by $\vec{L} = \vec{C}_{2\otimes}\vec{F}_3$ and $\overleftarrow{L} = \vec{F}_3\vec{C}_{2\otimes}$.

The arrows ←, → on the scattering matrices in eqs. (56)–(58) stand to indicate which propagation direction is followed by the light through the corresponding optical elements or portions to the fiber system. The coupling matrices $\vec{C}_{j\ominus}$ and $\vec{C}_{j\otimes}$ correspond to straight-through propagation and cross-coupling in the fiber coupler j=1 or 2, respectively.

We consider the case of an ideal, uniform and polarization-maintaining fiber, isolated from magnetic fields and having time-independent characteristics. Under such assumptions, the nonreciprocal parts of $\vec{C}_{j\ominus}$ and $\vec{C}_{j\otimes}$ vanish [24], and:

$$\vec{C}_{j\ominus} = \overleftarrow{C}_{j\ominus}^T = \overleftarrow{C}_{j\ominus} = \sqrt{(1-\epsilon_j)(1-\eta_j)}\, e^{i\frac{\pi}{4}}\hat{I} \quad (59)$$

$$\vec{C}_{j\otimes} = \overleftarrow{C}_{j\otimes}^T = \overleftarrow{C}_{j\otimes} = \sqrt{(1-\epsilon_j)\eta_j}\, e^{-i\frac{\pi}{4}}\hat{J} \quad (60)$$

where $\epsilon_j$ and $\eta_j$ are the fractional propagation loss and the power coupling ratio of fiber coupler j=1, 2, respectively.

Assuming that the fiber leads corresponding to scattering matrices $F_1$ and $F_2$ have lengths $L_1$ and $L_2$, respectively and negligible propagation loss, we have likewise $\vec{F}_j=\vec{F}_j^T=\vec{F}_j\hat{J}(L_j)$, with $\hat{J}$ being the signal Jones matrix defined in eq. (A5). Finally, using the results of section I-A, and assuming the pump wave to be linearly polarized along the ox birefringence axis, we have $\vec{F}_3=\vec{F}_3^T=\vec{F}_3=\sqrt{T_s}\hat{J}(L)\hat{K}$ with $\hat{K}\equiv\hat{K}+(L)=\hat{K}-(0)$. Using eq. (60), the reentrant loop scattering matrix $\hat{L}$ writes:

$$\vec{L} = \overleftarrow{L} = \hat{L} = \begin{pmatrix} \sqrt{\Delta_x}\exp\left\{i\left(\beta_s^x L - \frac{\pi}{4}\right)\right\} & 0 \\ 0 & \sqrt{\Delta_y}\exp\left\{i\left(\beta_s^y L - \frac{\pi}{4}\right)\right\} \end{pmatrix} \quad (61)$$

with $\Delta_x=\gamma_{s2}\eta_{s2}T_sG$, $\Delta_y=\gamma_{s2}\eta_{s2}T_s$, $\gamma_{s2}=1-\epsilon_2(\lambda_s)$ and $\eta_{s2}=\eta_2(\lambda_s)$.

Equations (56)–(58) show that the system scattering matrix $\hat{R}_2$ is a function of $\hat{L}^n$. Since $\hat{L}$ is diagonal, $[L^n]_{ij}=\delta_{ij}L_{ij}^n$. It is clear then from eq. (61) that the signal amplitude along the oy birefringence axis vanishes with increasing number of signal recirculations, since $\Delta_y=\gamma_{s2}\eta_{s2}T_s<1$. On the other hand, the gain G along the ox birefringence axis can be adjusted so that:

$$\Delta_x=\gamma_{s2}\eta_{s2}T_sG=1 \quad (62)$$

which expresses that the internal gain in the fiber loop compensates exactly for the overall loop loss. As a result of the fullfilment of condition (62), the modulus of $[\hat{L}^n]_{11}$ is independent of n, i.e. the amplitude of the signal pulses are maintained constant at each recirculation.

The critical pump power $P_p^{in,crit}$ for which eq. (62) is verified is, using eq.(11) for z=L and neglecting the interference term in $\sin(\beta_p^x L)/\beta_p^x$:

$$P_p^{in,crit} = \frac{A f_{ps}}{g_r L_f} \cdot \frac{1-T_p\eta_{p2}}{1-\eta_{p2}} \cdot \frac{\ln[(\gamma_{s2}\eta_{s2}T_s)^{-1}]}{\gamma_{p1}\gamma_{p2}} \quad (63)$$

with $T_p\equiv T_p(L)$ and $L_f\equiv L_f(L)$. The factor $1-T_p\eta_{p2}$ in eq.(63) comes from the infinite number of pump power recirculations in the reentrant fiber loop [23], which occurs when $\eta_{p2}\neq 0$. Equation (37) shows that the critical pump power $P_p^{in,crit}$ is independent of the coupling ratio $\eta_{p1}$ of the BS/C coupler, and decreases as the passive reentrant loop transmission $\gamma_{s2}\eta_{s2}T_s$ increases. Minimization of $P_p^{in,crit}$ is obtained for $\eta_{p2}=0$ and $\eta_{s2}\approx 1$, which requires from the reentrant loop coupler to have a strong multiplexing effect [10,25].

A convenient way to calculate the output signal power corresponding to the number n of recirculations is to use the signal coherency matrix [26], which writes, with the notations adopted in this paper:

$$\hat{S}^{in,out} = \frac{N_s^2}{\psi_s^2} \langle (E_s^{in,out})^T E_s^{in,out} \rangle \quad (64)$$

$$= \frac{N_s^2}{\psi_s^2} \begin{pmatrix} \langle E_{sx}^{in,out}E_{sx}^{*in,out}\rangle & \langle E_{sx}^{in,out}E_{sy}^{*in,out}\rangle \\ \langle E_{sy}^{in,out}E_{sx}^{*in,out}\rangle & \langle E_{sy}^{in,out}E_{xy}^{*in,out}\rangle \end{pmatrix}$$

where the brackets $\langle\rangle$ signify infinite time average. As shown in eq.(64), the average signal power is given by the trace of the coherency matrix.

Given the input signal coherency matrix $\hat{S}^{in}$, and a fiber system characterized by a scattering matrix $\hat{T}$, the output signal coherency matrix is given by $\hat{S}^{out}=\hat{T}\hat{S}^{in}\hat{T}^+$, where + stands for the Hermitic conjunction.

Using eqs. (55)–(61), the system scattering matrix $\hat{R}_n$ takes the form:

$$\hat{R}_n = \sqrt{A\eta_{s1}(1-\eta_{s1})}\cos(n\phi_s)\begin{pmatrix} (\Delta_x)^{\frac{n}{2}}\exp(i\phi_n^x) & 0 \\ 0 & (\Delta_y)^{\frac{n}{2}}\exp(i\phi_n^y) \end{pmatrix} \quad (65)$$

with $\phi_n^{x,y}=\beta_s^{x,y}(L_1+L_2+nL)-(n-3)\pi/4$, $A=\gamma_{s1}^2\gamma_{S2}(1-\eta_{s2})^2/\eta_{s2}$, $\eta_{s1}=\eta_1(\lambda_s)$, and $\gamma_{s1}=1-\epsilon_1(\lambda_s)$. Using eqs. (55), (64) and (65) the output signal coherency matrix $\hat{S}_n^{out}$, corresponding to n signal recirculations in the loop, writes:

$$\hat{S}_n^{out} = \hat{R}_n\hat{S}^{in}\hat{R}_n^+ = AP_s^{in}\eta_{s1}(1-\eta_{s1})\cos^2(n\phi_s)\times \quad (66)$$

$$\begin{pmatrix} (\Delta_x)^n\cos^2\theta_s & \frac{1}{2}(\Delta_x\Delta_y)^{\frac{n}{2}}\sin2\theta_s\exp(in\Delta\beta_s L) \\ \frac{1}{2}(\Delta_x\Delta_y)^{\frac{n}{2}}\sin2\theta_s\exp(-in\Delta\beta_s L) & (\Delta_y)^n\sin^2\theta_s \end{pmatrix}$$

with $P_s^{in}$ being the peak power of the input signal pulse, $\theta_s$ being the angle of the linear polarization of the input signal with respect to the ox birefrigence axis, and with the approximation $L_1+L_2 << nL$.

The peak power $P_s^{out,(n)}$ of the output signal pulses is given by the trace of the output signal coherency matrix $\hat{S}_n^{out}$ in eq. (66):

$$P_s^{out,(n)} = Tr(\hat{S}_n^{out}) = \qquad (67)$$

$$AP_s^{in}\eta_{S1}(1-\eta_{S1})\cos^2\theta_s\cos^2(n\phi_s)(\Delta_x)^n\left\{1+\left(\frac{\tan\theta_s}{G_x^n}\right)^2\right\}$$

It is clear from eq.(67) that output signal power maximization is achieved by choosing $\eta_{S1}=0.5$, which corresponds to a 50% splitting efficiency in the BS/C coupler. In addition, this condition also minimizes the non-reciprocal phase shift due to the optical Kerr effect which results from the difference in optical powers between the two counterpropagating signal pulses, as shown in section I-B. Another output signal power maximization can be realized by choosing $\theta_s=0$, or the input signal polarization parallel to the pump polarization (which is along the ox birefringence axis in our example). As seen in section I-A, this condition maximizes the Raman gain in the reentrant fiber loop. Finally, the coefficient A in eq. (67) can be increased by choosing a value close to unity for the loop coupling ratio $\eta_{s2}$, except $\eta_{S2}=1$ for which no input signal is coupled into the loop. In addition, a high loop coupling ratio minimizes the overall loop loss and consequently, minimizes the critical pump power $F_p^{in,crit}$, as shown in eq. (63). Under such optimal conditions, the output signal power writes:

$$P_s^{out,(n)} = \frac{1+\cos(2n\phi_s)}{2} \cdot \exp[n\ln(\Delta_x)] \frac{A}{4} P_s^{in} \qquad (68)$$

Equation (68) shows that the envelope of the output signal pulse train power is modulated by two factors. First, the nonreciprocal Sagnac phase shift $2n\phi_s$, increasing proportionally to the number of signal recirculations, results in a sinusoidal power modulation of the output signal. Second, the effect of signal recirculations in the active reentrant loop causes an exponential power modulation, which is a growing or a decaying function of the recirculations, depending on the loop transmission or net gain $\Delta_x$. When the internal Raman gain exactly compensates for the overall loop loss, i.e. $\Delta_x=1$, the output pulse train envelope is a sinusoidal waveform. The number of zero crossings of this sinusoidal modulation is the, through the nonreciprocal Sagnac phase shift, a function of the rotation rate.

Expressing the Sagnac phase shift $2\phi_s$ as a function of the rotation rate $\Omega$, we have [27]:

$$2\phi_s = 2\pi \frac{LD}{c\lambda_s} = 2\pi FT_{loop} \qquad (69)$$

where:

$$F = \frac{D\Omega}{n_s^z \lambda_s} \qquad (70)$$

is the frequency of the envelope modulation, $T_{loop}=n_s^z L/c$ the loop transit time $n_s^z$ the signal refractive index along the oz birefringence axis and D the loop diameter. Using eqs. (68),(69) with $\Delta_x=1$, the output signal power writes finally:

$$P_s^{out,(n)} = \frac{1+\cos(2\pi F \cdot nT_{loop})}{2} \frac{A}{4} P_s^{in} \qquad (71)$$

As seen in eqs. (69)–(71), the characteristic feature of the reentrant fiber gyroscope is that the modulation frequency f of the signal output scales linearly with the rotation rate $\Omega$, as in the case of the ring laser gyroscope [27]. For detecting small rotation rates, long optical delays ($nT_{loop}$) must be achieved, corresponding to large numbers of signal recirculations. As seen in eq. (67), the passive operation of the reentrant fiber gyroscope does not permit to achieve such long optical delays, since the output signal power decays rapidly as $(\Delta_x)^n$, the loop transmission $\Delta_x$ being in this case lower than unity. On the other hand, the active operation of the system cancels the effect of signal attenuation, and increases indefinitely the optical delay as long as the pump in turned on. Actually, the maximum optical delay achievable is determined by the decay of the output signal-to-noise- ratio, which is caused by the amplification of the spontaneous noise, or stimulated scattering, which has been studied in section I-C. The question is of the SNR decay is discussed in the next section.

I - E. System performance limits

In this section, the performance limits of the reentrant fiber gyroscope are evaluated. These limits have two origins. First, the nearly quadratic decay of the SNR with the number of signal recirculations determines for a required output SNR a maximum possible number of recirculations, or optical delay. Since the accumulated Sagnac phase shift scales as the reciprocal of the optical delay, there exists then a minimum detectable Sagnac phase shift, to which corresponds for a given system a minimum detectable rotation rate $\Omega_{min}^{(n)}$. Second, the nonreciprocal phase noise induced by the optical Kerr effect and the backward Rayleigh scattering cause a rotation-rate error $\delta\Omega^{(n)}$, which magnitude increases with the optical delay. Then, the parameters $\Omega_{min}^{(n)}$ and $\delta\Omega^{(n)}$ set together the practical performance limits of the active reentrant fiber Raman gyroscope.

System output SNR—The output signal-to-noise ratio $SNR^{(n)}$ corresponding to n signal recirculations when the system is at rest ($\Omega=0$) can be derived from the results obtained in section I-C. Assuming the system perfectly reciprocal, the total mean and variance of the gyroscope output $<n_{(n)}^{out}>$, $[\sigma_{(n)}^{out}]^2$ are given respectively by the sums of the mean values and the variances $-n_{(n),out}^{\pm}>$ and $[\sigma_{(n),out}^{\pm}]^2$ of the output signals (this is equivalent to assuming that the two signals which are recombined at the reciprocal port have strictly equal phases). Given $<n_{(n)}^{\pm}>$ and $[\sigma_{(n)}^{\pm}]^2$ (eq. (50),(54)) which represent the mean and the variance of the photon population re-entering the fiber loop, the total mean and variance of the gyroscope output $<n_{(n)}^{out}>$, $[\sigma_{(n)}^{out}]^2$ are given by:

$$\begin{pmatrix} <n_{(n)}^{out}> \\ [\sigma_{(n)}^{out}]^2 \end{pmatrix} = \begin{pmatrix} <n_{(n),out}^+> + <n_{(n),out}^-> \\ [\sigma_{(n),out}^+]^2 + [\sigma_{(n),out}^-]^2 \end{pmatrix} = \qquad (72)$$

$$\hat{D}_1 \otimes \hat{D}_2 \ominus \hat{D}_2^{-1} \begin{pmatrix} <n_{(n)}^+> \\ [\sigma_{(n)}^+]^2 \end{pmatrix} + \hat{D}_1 \ominus \hat{D}_2 \ominus \hat{D}_2^{-1} \otimes \begin{pmatrix} <n_{(n)}^-> \\ [\sigma_{(n)}^-]^2 \end{pmatrix}$$

where $\hat{D}_{j\ominus}$ and $\hat{D}_{j\otimes}$ ($j=1,2$) are the fiber coupler transfer matrices [16] corresponding to the straight-through and cross coupling paths, which relate the output statistical parameters to the input statistical parameters. The order of the matrix products in eq. (72) corresponds to the system geometry pictured in FIG. 3. The input conditions $<n_{(0)}^\pm>$ and $[\sigma_{(0)}^\pm]^2$ in eqs. (50),(54) which corresponds to the signals entering the sensing loop are likewise related to the system input signal conditions $<n_{in}>$, $\sigma_{in}^2$ through:

$$\begin{pmatrix} <n_{(0)}^{+,-}> \\ [\sigma_{(0)}^{+,-}]^2 \end{pmatrix} = \hat{D}_{2\ominus}\hat{D}_{1\ominus,\otimes} \begin{pmatrix} <n_{in}> \\ \sigma_{in}^2 \end{pmatrix} \quad (73)$$

The transfer matrices $\hat{D}_{j\ominus,\otimes}$ have for expressions:

$$\hat{D}_{j\ominus,\otimes} = d_j \begin{pmatrix} 1 & 0 \\ 1 - d_j d_j \end{pmatrix} \quad (74)$$

with $d_j \equiv A_{sj}\eta_{sj}\gamma_{sj}$ for the $\ominus$ case and $d_j \equiv \eta_{sj}\gamma_{sj}$ for the $\otimes$ case, with $A_{sj}=(1-\eta_{dj})/\eta_{sj}$.

Using eqs. (50),(54), (72)–(74), and assuming $A_{s1}=1$ ($\eta_{s1}=0.5$), the mean and the variance $<n_{(n)}^{out}>$, $[\sigma_{(n)}^{out}]^2$ of the total output signal take the form:

$$<n_{(n)}^{out}> = \quad (75)$$

$$\kappa \Big\{ [2 + n(\epsilon^+ + \epsilon^-) + n(n-1)\epsilon^+\epsilon^-]<n_{in}> + n\Big(N + \frac{n-1}{2}N''\Big)\Big\}$$

$$[\sigma_{(n)}^{out}]^2 = 2\kappa^2 (\sigma_{in}^2 - <n_{in}>) + \kappa(2<n_{in}> + nN) + \quad (80)$$

$$\kappa^2\{2nN<n_{in}> + n^2(N^2 - 2N')\} +$$

$$\epsilon\kappa^2\Big\{2n<n_{in}>^2 + n^2N<n_{in}> + n^3\frac{1+2K}{3}N'\Big\}$$

with $\mu=\gamma_s]A_2/2$, $\kappa=\mu^2/K=A/4, \epsilon=\epsilon^+ + \epsilon^-,$
$N=(N^++N^-)/\mu$, $N'=N^+N^-/\mu^2$ and
$N''=(\epsilon^+N^++\epsilon^-)/\mu$.

For simplicity, we assume in the rest of this study that the pump power is equally splitted by the BS/C coupler, i.e. $\eta_p \equiv \eta_{p1}=0.5$. In such a case, $\epsilon^+=\epsilon^-=b$ and $N^+=N^-$. Assuming a detecting bandwidth matched with the signal bandwidth and the input signal being to Poisson statistics ($\sigma_{in}^2=-n_{in}>$), using dqs. (75),(76) and definition in [16], the electrical baseband power output SNR obtained with an avalanche photodiode (APD) takes the form:

$$SNR_{QL}^{(n)} = \quad (80)$$

$$\frac{<n_{in}>\left(1 + nb + n^2\frac{b^2}{2}\right)^2}{2n\left[1 + \frac{2n}{<n_{in}>} + b\left(\frac{<n_{in}>}{2} + n + \frac{2}{3}n^2\frac{(1+2K)}{<n_{in}>}\right)\right]}$$

with $\epsilon=\eta_c\eta_d K<g>$ and:

$$\sigma_{shot}^2 = <n_{in}> + nN \quad (78)$$

$$\sigma_{beat}^2 = n<n_{in}>N + n^2(N^2-2N')+b\{2n<n_{in}>^2 + n^2N<n_{in}> + s^2n^3(1+2K)N'\} \quad (79)$$

In eq. (77), the parameter $<g>$ is the APD multiplication factor, x is an excess noise exponent, and $\sigma_{dc}^2$ and $\sigma_{th}^2$ are the variances of the dark current electron count and the thermal noise introduced by the electronic amplifier [16]; the parameter $\eta_c$ is the coupling efficiency of the system output to the APD, and $\eta_d$ is the APD quatum efficiency.

In the quantum limit corresponding to $\eta_c=\eta_d=<g>=1$, $\sigma_{dc}^2=0$ (ideal detector) and high gains ($K=1/\eta_{s2}\gamma_{s2}>1$), it is found $\xi>1, N^\pm \approx K$ (see [10]), and, considering the case $\gamma_{s1} \approx \gamma_{s2} \approx 1$, it is obtained $N \approx N' \approx 4$. The optimized SNR corresponding to the quantum limit is then:

$$SNR^{(n)} = \frac{2(1 + nb + n^2b^2/2)^2<n_{in}>^2}{\frac{<g>^{1+x}}{\xi}\sigma_{shot}^2 + \sigma_{beat}^2 + \frac{1}{\xi^2}(\sigma_{dc}^2 + \sigma_{th}^2)} \quad (77)$$

As shown in eq. (80), the quantum-limited SNR is, for small values of the parameter b, a monotonously decaying function of the number of signal recirculation. This decay is caused by the buildup of various beat noises in the active reentrant loop: the signal/Stokes beat noise (first term within brackets in the denominator), the Stokes/Stokes beat noise (second term) and the signal/Rayleigh beat noise (third term, between braces). For very large numbers of recirculations such that $n^2b^2>nb$, the additional output signal generated by two successive Rayleigh backscatterings (numerator in eq.(80)) contributes to a slower SNR decay.

DC noise and Gain saturation—Before considering numerical examples for the output $SNR_1$ one first has to evaluate the amount of the DC output noise (Stokes and Rayleigh noises) and determine from this amount the limit of validity of the undepleted pump model used in this theory. Indeed, because of the buildup of the Stokes and Rayleigh noises, pump depletion and consequent gain saturation should occur after a certain number of recirculations beyond which the undepleted pump model is no longer valid.

Figure 4:
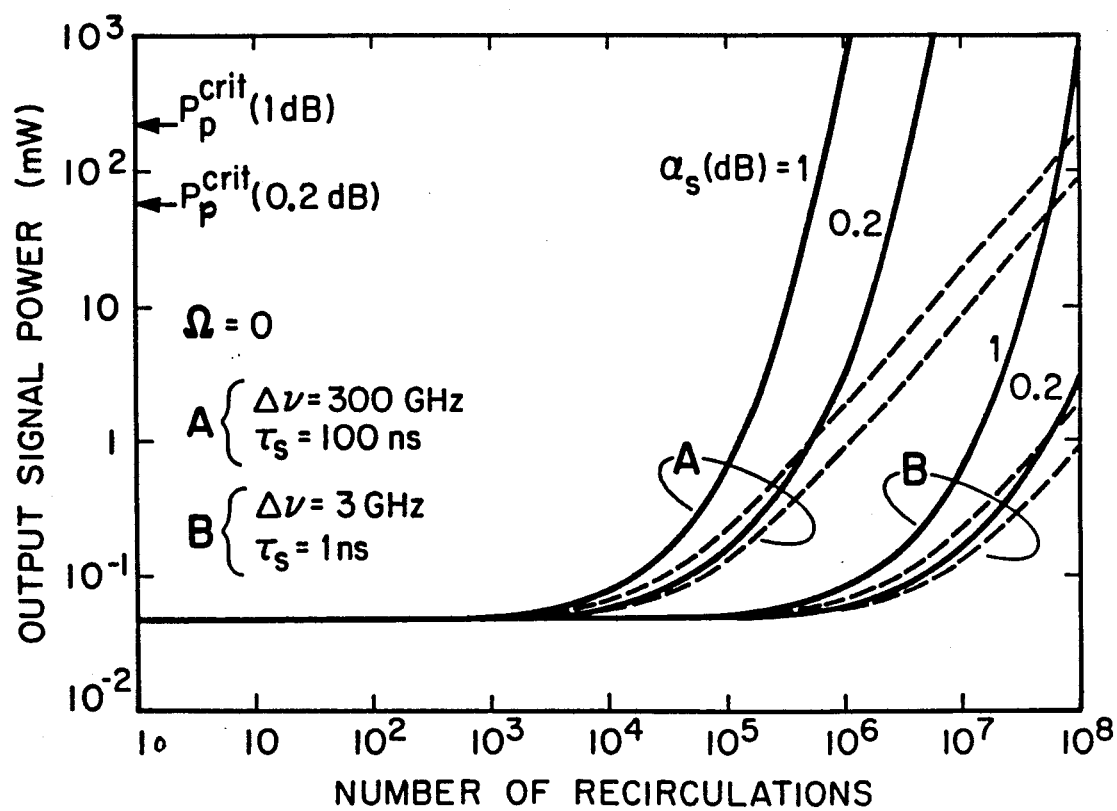
FIG. 4 is a graph of the mean output signal power as a function of the number of recirculations of the optical signal when the internal Raman gain compensates for the loop loss and when the system is at rest.

FIG. 4 shows plots of the means output signal power $<P_{(n)}^{out}>=<n_{(n)}^{out}>v v\Delta v$ of the re-entrant gyroscope (where v and $\Delta v$ are the signal frequency and bandwidth, respectively, and $<n_{(n)}^{out}>$ is given by eq. (75)) as a function of the number of recirculations when internal Raman gain compensates for the loop loss ($\Delta_x=1$) and when the system is at rest ($\Omega=0$). The signal wavelength is assumed to be $\lambda$, $=1.55\,\mu m$, and the loop coupling ratio to be $\eta_{s2}=0.9$. The input signal power $<p_s^{in}<n_{in}>h v\,\Delta v$ is assumed to be 10 mW, which corresponds to a practical power limit imposed by Stimulated Brillouin scattering [10]. This power limit is explained by the following: considering the loop coupling ratio of $\eta_{s2}=0.9$, the amount of signal power recirculating in the loop in each direction is 500 $\mu$W, which is an order of magnitude below the accepted SBS threshold in single-mode fibers [28].

The two sets of curves (A) and (B) in the figure illustrate respectively a worst and a best case: in curves (A), the signal bandwidth $\Delta v$ is 300 GHz, and the signal pulsewidth $\tau_s$ is 100 ns; in curves (B), these parameters are $\Delta v=3$ GHz and $\tau_s=1$ ns. In each series, the mean output is plotted for two values of the fiber attenuation coefficient, i.e. $\alpha_s=1$ dB/km and $\alpha_s=0.2$ dB/km. The dashes lines correspond to the case when Rayleigh scattering is not included in the theory (i.e. b=0 in eq.(75)); they show the contribution of the Stokes noise alone, whereas the difference between the levels indicated by the full lines and the dashed lines show the contribution of Rayleigh noise. The other parameters are assumed to have the following values: $\gamma_{s1}=\gamma_{s2}=0.95$, $\eta_{s1}=0.5,\eta_{s2}=0.9,L=1$ km and N.A.=0.1 rad.

In the case of a relatively small signal bandwidth ($\Delta v=3$ GHz, curves (B)), it can be seen in the figure that the output signal power is constant with increasing number of recirculations and remains unaffected by the Stokes and Rayleigh noises up to a $10^5$-$10^6$ recirculations. This is due to the fact that the amount of Stokes noise in the considered bandwidth (3 GHz) is small, as well as the amount of Rayleigh backscattered noise with the considered signal pulsewidth (1 ns). As seen in the curved (B), an increase of the attenuation coefficient $\alpha_s$ corresponds to a sizeable increase of the noise power, mainly due to Rayleigh backscattering, as expected (the dashed curves show that in this case the Stokes nose also increases, since higher gain is needed to compensate for the loop loss).

Curves (A) in FIG. 4 show that in the case of a relatively large signal bandwidth (300 GHz), and pulsewidth (100 ns), the output noise builds up after about $10^3$ recirculations, which limits considerably the system performance. The two examples of the figure show that fiber attenuation, signal pulsewidth and signal bandwidth have to be minimized in order to obtain a large number of recirculations with a relatively low DC noise level.

In practice, the effect of gain saturation by pump power depletion in the fiber loop, not accounted for in this theory, imposes an upper bound to the total output signal power. The effect of gain saturation can be considered to occur at the point where the total signal power recirculating within the fiber loop is of the same order of magnitude as the pump power providing for the gain [10]. Since the loop coupling ratio is $\eta_{s2}=0.9$, the signal power is 10 times higher in the loop than at the system output port. The critical pump powers for the two fiber attenuation cases ($\alpha_s=1$ dB/km and 0.2 dB/km), are respectively 120 mW and 57 mW, as given from eq.(63), assuming a mode radium at $\lambda_s=1.55$ $\mu$m of $\omega_0=3$ $\mu$m, and a Raman gain coefficient of $gr=10.2\times10^{-14}$ m/W evaluated from ref.[15]. In the evaluation of the gain coefficient, a pump wavelength of $\lambda_p=1.44$ $\mu$m corresponding to the fused silica Raman shift of $\Delta v_R=490$ cm$^{-1}$ [9], has been assumed. When the Stokes noise is dominant (as in the case of very short signal pulses), it can be seen from the figure that gain saturation occurs after $10^6$-$10^7$ recirculations, if the effective Stokes noise bandwidth participating in the pump power depletion is assumed to be of the order of 300 GHz. Thus, the system performance, as determined by the maximum achievable number of recirculations, is limited by the effect of gain saturation, which occurs primarily from the buildup of the Stokes noise.

Figure 5:
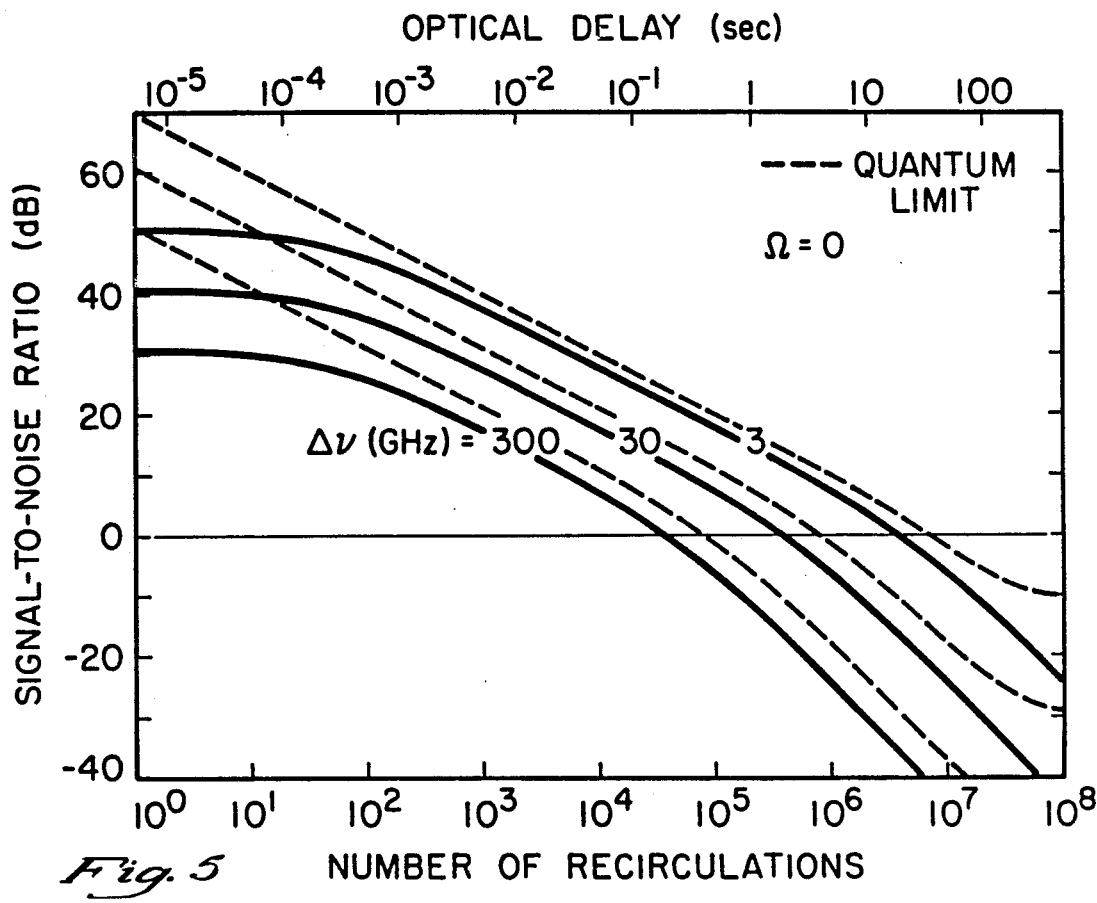
FIG. 5 is a graph of the signal to noise ratio in the absence of rotation as a function of the number of recirculation for different values of the signal bandwidth.

The system theoretical output SNR, obtained in absence of rotation, (as expressed in eq.(77)) is plotted in FIG. 5, for different values of the signal bandwidth $\Delta v$, as a function of the number of recirculations. The APD detector is assumed to be ideal, and thermal noise is neglected ($\sigma_{th}^2=0$); the signal pulsewidth is assumed to be $\tau_s=1$ ns, the fiber attenuation to be $\alpha_s=0.2$ dB/km, and the other parameter values are the same as in FIG. 4. The dashed curves in the figure correspond to the quantum limit, as expressed in eq.(80). It can be seen from the figure that, as previously stated, the output SNR of the Raman active re-entrant fiber gyroscope decays monotonously with increasing number of signal recirculations, due essentially to the linear growth of the signal/Stokes beat noise, as in the similar case of Raman active recirculating delay lines [16]. Beyond the 0 dB SNR level, the decay becomes quadratic with the number of recirculations, due to the buildup of the Stokes/Stokes beat noise. In this example, the effect of Rayleigh scattering (which causes eventually a cubic SNR decay, as shown in eq.(79)) is negligible. It can be seen in the figure that, in the domain of interest of relatively high SNR, the decay is essentially proportional to the number of recirculations. The figure shows also that the output SNR is practically independent of the loop coupling ratio $\eta_{s2}$, since the difference between the case $\eta_{s2}=0.9$ (full line) and the quantum limit case corresponding to high gains, or $\eta_{s2}\approx0$ (dashed line) is quite small. The figure shows that for the 3 GHz signal bandwidth, the output SNR is about 10 dB after $n=10^6$ signal recirculations. As seen previously, this number of signal recirculations corresponds also to the lower bound of gain saturation regime. Therefore, in the considered example which represents an optimized case, the value of $n=10^6$ can be viewed as being an upper limit. As shown below, such limit in the achievable number of recirculations also represents a lower bound to the achievable accumulated Sagnac phase shift, which limits consequently the sensitivity to rotation rate.

Rayleigh-induced phase error—As stated in section I-C, the Rayleigh scattered waves although coherent, have unpredictable phases which are not identical for the two propagating directions [21]. Such nonreciprocal phase noise adds to the nonreciprocal Sagnac phase shift and therefore results in a phase-reading error. The maximum phase deviation $\phi_{Rayleigh}^{(n)}$ due to backward Rayleigh scattering can be expressed as [21]:

$$\phi_{Rayleigh}^{(n)} = 2\arctan\left(\sqrt{\frac{<n_{(n),out}^{Rayleigh}>}{<n_{(n),out}^{signal}>}}\right) \quad (81)$$

where $<n_{(n),out}^{Rayleigh}>$ is the mean photon number of the total output Rayleigh-scattered wave and $<n_{(n),out}^{signal}>$ is the mean photon number of the total output primary signal waves. Using eq.(75), and considering the worst case of large gains (for which one obtains $N^{\pm}/\mu\approx2$), the phase error writes:

$$\phi_{Rayleigh}^{(n)} = 2 \arctan \left\{ \sqrt{nb \left[ 1 + \frac{nb}{2} + \frac{n}{<n_{in}>} \right]} \right\} \quad (82)$$

In the argument in eq.(82), the first term corresponds to the Rayleigh noise generated from the backscattering of the primary signal waves, the second term corresponds to the noise generated by two successive Rayleigh backscatterings of the primary signal waves, and the third term to the nose generated from the Rayleigh backscattering of the Stokes noise.

Figure 6:
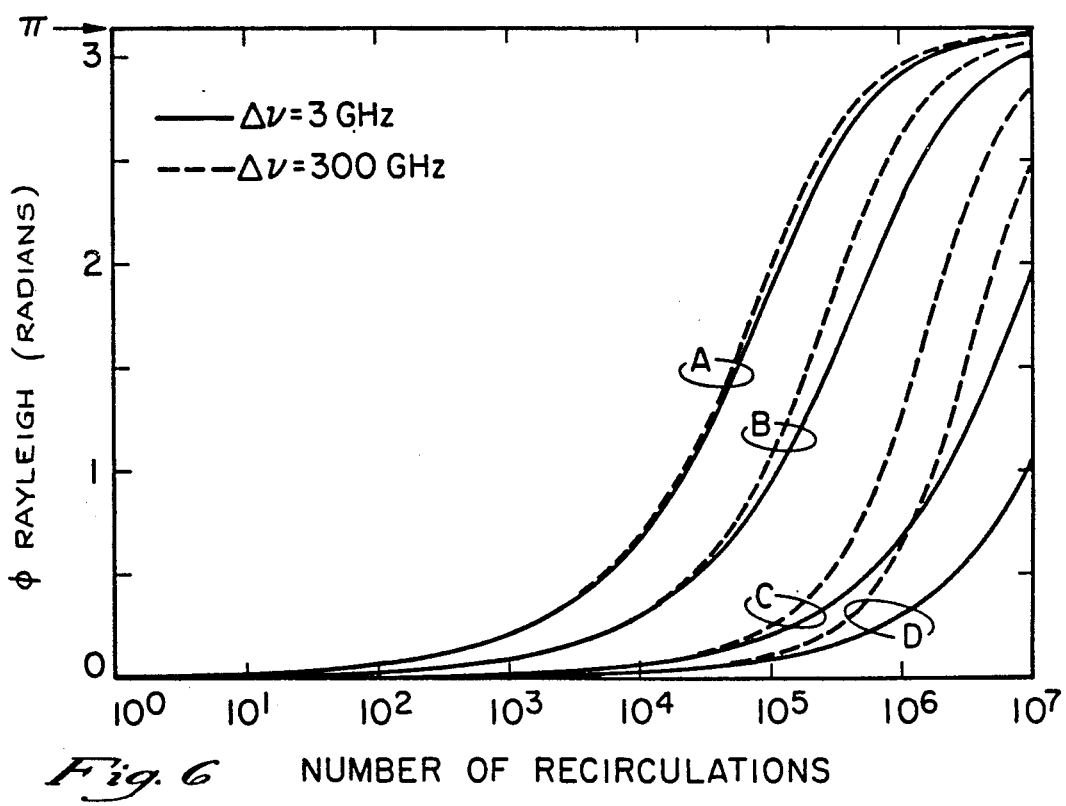
FIG. 6 is a graph of the phase error due to Rayleigh scattering as a function of the number of recirculations for different values of the signal bandwidth and pulse width, and the fiber attenuation.

FIG. 6 shows plots of the phase error $\phi_{Rayleigh}^{(n)}$ as a function of the number of recirculations, for different values of the signal bandwidth and pulsewidth, and the fiber attenuation, as given in eq.(82). It can be seen in the figure that the phase error due to Rayleigh backscattering decreases as the fiber attenuation or the signal pulsewidth decreases, as expected. For the worst case described in FIG. 5 ($\tau_s = 100$ ns, $\alpha_s = 1$ dB/km), the phase error is about $\pi$ after $10^6$ recirculations, or an average of $\pi$ microradians per recirculation. For the optimized case ($\tau_s = 1$ ns, $\alpha_s = 0.2$ dB/km), this error is reduced by a factor of 10, i.e. $\phi_{Rayleigh} \approx \pi/10$ $\mu$radians per recirculation.

Kerr-induced phase error—Another source of phase-reading error is due to the nonreciprocal phase modulation induced by the OKE. In section 1-B, it has been shown that this phase modulation can be expressed as the sum of three contributions (eq.(28)) due to the pump-induced, the self-induced and the cross-induced OKE. Assuming that the signal waves propagate only in the ox polarization mode, the accumulated nonreciprocal phase shift $\phi_{Kerr}^{(n)}(t)$ corresponding to n recirculations in the reentrant fiber loop can be expressed from eqs.(28),(31) as:

$$\phi_{Kerr}^{(n)}(t) = \sum_{q=1}^{n} [\Delta \hat{\Phi}_K(t_{(q)})]_{xx} \quad (83)$$

$$= \sum_{q=1}^{n} \chi_{1111} \left[ \gamma_{p1} \gamma_{p2} (2\eta_{p1} - 1) C_p \left( P_p^{in}(t_{(q)} - \tau) L_{fp} - <T_p \left[ \frac{V}{2} (t_{(q)} - t') \right] P_p^{in}(t') >_{2\tau L} \right) + C_s \{ L_x(t_{(q)}) - 2M_x(t_{(q)}) \} \right]$$

with $t_{(q)} = t - (n-q)\tau$. Eq.(83) represents the most general expression for the total accumulation phase shift due to the OKE, in the case of a time-varying pump power. The first term in the right-hand side in eq.(83) representing the pump-induced OKE shows that pump power fluctuations induce a time-dependent, nonreciprocal phase error, which does not increase necessarily with the number of recirculations and can have an arbitrary sign. This feature suggests that a possible way to suppress the total nonreciprocal OKE-induced phase shift in the active re-entrant fiber gyroscope would consist in using the pump-induced OKE to cancel the effects of the self-OKE and cross-OKE; this could be achieved by modulating the pump power with an appropriate modulational scheme.

In particular, eq.(83) shows that pump-OKE vanishes either when $\eta_{p1} = 0.5$, which corresponds to the symmetrical pumping scheme, or when the pump power fluctuations are slow compared to the loop transit time $\tau$.

In this study, only the case of a constant pump power, equally divided in the two propagation directions, is considered. In such a case, using eq.(33),(35),(83) and the identity $P_{sx}^+ - P_{sx}^- = \gamma_{s1}\gamma_{s2}(1-\eta_{s2})(1-2\eta_{s1})P_s^{in}$, the phase shift $\phi_{Kerr}^{(n)}$ writes:

$$\phi_{Kerr}^{(n)} \approx nC_s \chi_{1111} P_s^{in} L_{fs} \gamma_{s1} \gamma_{s2} (1 - \quad (84)$$

$$\eta_{s2})(1 - 2\eta_{s1}) \left\{ \frac{K-1}{\ln(K)} - \sqrt{K} \frac{V\tau_s}{L_{fs}} \right\}$$

Equation (84) shows that: (a) the OKE-induced phase shift is null when the input signal power is equally divided in the two propagation directions, i.e. $\eta_{s1} = 0.5$ (in other terms, the OKE is in this case reciprocal); (b) $\phi_{Kerr}^{(n)}$ can be reduced with a high loop coupling ratio, i.e. $\eta_{s2} \approx 1$, which minimizes the amount of recirculating signal power as well as the gain $K = 1/\gamma_{s2}\eta_{s2}$; (c) in the case of short signal pulses, such that $\tau_s << L_{fs}/V$, the cross-induced OKE is negligible in comparison to the self-induced OKE; (d) the nonreciprocal phase shift due to OKE grows linearly with the number of recirculations.

Figure 7:
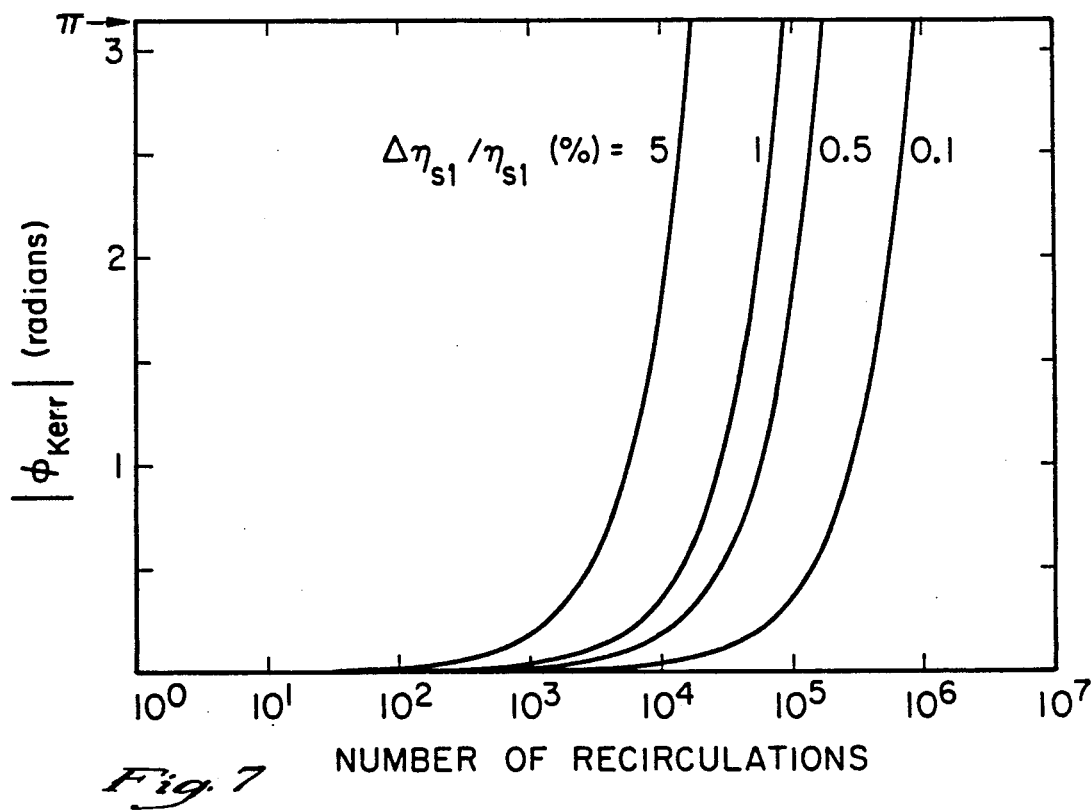
FIG. 7 is a graph of the Kerr induced phase shift as a function of the number of recirculations for different coupling ratios of the beam splitting coupler.

In practice, the condition $\eta_{s1} = 0.5$ can be fulfilled experimentally only within a certain accuracy $\Delta \eta_{s1}/\eta_{s1}$. FIG. 7 shows plots of $|\phi_{Kerr}^{(n)}|$ as a function of the number of recirculations, for different values of $\Delta \eta_{s1}/\eta_{s1}$. The parameters are $\tau_s = 1$ns (cross-induced OKE negligible), $\lambda_s = 1.55$ $\mu$m, $\alpha_s = 0.2$ dB/km, L = 1 km, $\eta_{s2} = 0.9$, $\gamma_{s1} = \gamma_{s2} = 0.95$, $\omega_0 = 3$ $\mu$m, $\chi_{1111} = 3.5 \times 10^{-15}$ esu $\times 10^7$ [11,18].

As seen in the Figure, the OKE-induced phase shift is about $\pi$ after $10^4$, $10^5$ and $10^6$ recirculations for $\Delta \eta_{s2}/\eta_{s2} = 5\%$, 1%, and 0.1%, respectively. This shows that i order to avoid an OKE-induced phase shift of sizeable magnitude, a very good control of the 50% splitting efficiency in the BS/C coupler is necessary. This nonreciprocal phase shift imposes a lower bound on the system sensitivity to the Sagnac phase shift accumulated by the effect of signal recirculations, and therefore to the rotation rate.

Minimum detectable rotation rate–A minimum detectable rotation rate $\Omega_{min}^{(n)}$ can be arbitrarily defined for each number n of recirculations by an accumulated Sagnac phase shift of $2\pi$, or $2n\phi_s = 2\pi$, which corresponds to a single period of the modulated signal output. From eq. (69), (70), this minimum detectable rotation rate is given by $\Omega_{min}^{(n)} = c\lambda/nLD$. On the other hand, the nonreciprocal phase shifts $\phi_{Kerr}^{(n)}$ and $\phi_{Rayleigh}$ caused by the OKE and the Rayleigh backscattering contribute to a rotation rate error $\delta \Omega^{(n)}$. Using eq. (69), this rotation rate error can be expressed $$\delta \Omega^{(n)} = \frac{c\lambda_s}{nLD} \cdot \frac{\phi_{Rayleigh}^{(n)} + \phi_{Kerr}^{(n)}}{2\pi} \quad (85)$$

with $\phi_{Rayleigh}$ and $\phi_{Kerr}$ given by eqs. (82) and (84).

Figure 8:
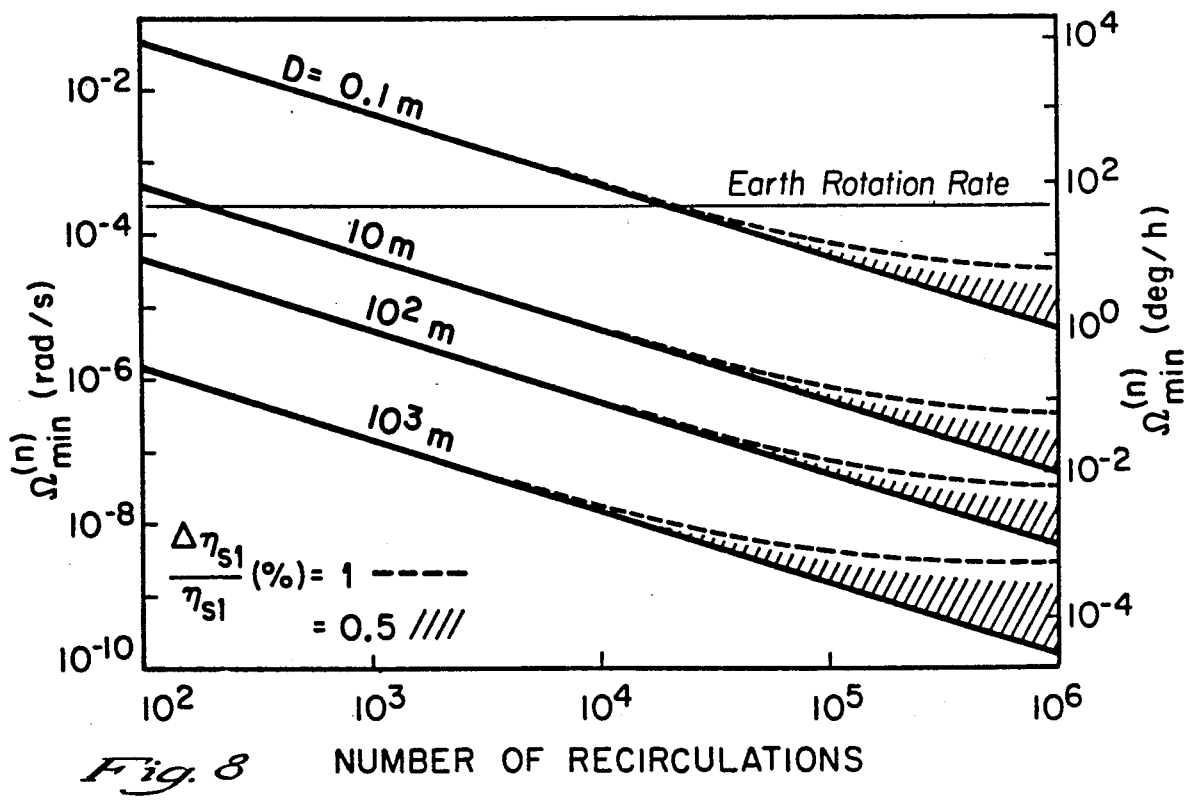
FIG. 8 is a graph of the minimum detectable rotation rate as a function of the number of recirculations, and illustrates the effect of discrepancies in the ideal coupling ratio of the beam splitting coupler.

FIG. 8 shows plots of $\Omega_{min}^{(n)}$ as a function of the number of recirculations, to which is added the rotation rate error $\delta \Omega^{(n)}$ corresponding to two BS/C coupling ratio discrepancies form the 50% ideal case (shaded areas and dashed lines). The top boundaries of the shaded areas (or the dashed lines), determine thus the actual minimum detectable rotation rates for a given number of recirculation. Each curve corresponds to a sensing loop diameter D; the total loop length is L=1 km, except for the bottom curve corresponding to a 1 km loop diameter where the length has been chosen arbitrarily to L=3.14 km. The relative discrepancy $\Delta\eta_{s1}/\eta_{s1}$ of the BS/C coupling ratio from the 50% case is 0.5% (top boundaries of the shaded areas) and 1% (dashed lines). Such range of values is within the possibilities of current technology. The other parameters are the same as in FIG. 7. The maximum number of recirculations is in this examples $10^6$, for which the output SNR is about 10 dB, as shown in section I-E. As seen in the figure, the minimum practically detectable rotation rate $\Omega_{min}^{(n)} + \delta\omega^{(n)}$ corresponding to a 10 cm diameter sensing loop is at the level of the earth rotation rate (i.e. 15 deg/hour) after about $2.10^4$ recirculations, and reaches a lowest value of less than 10 deg/hour at the 10 dB SNR limit (n=$10^6$). Suppression of the OKE-induced rotation rate error $\delta\Omega^{(n)}=0$ would bring this lowest value to 1 deg/hour. However, the figure shows that high rotation-rate sensitivities can be achieved by increasing the loop diameter: considering the n=$10^6$ recirculations limit, these minimums are lower than $10^{-1}$ deg/hour (D=10 m), $10^{-2}$ deg/hour (D=100 m), and $10^{-3}$ deg/hour (D=1 km). In the later case, if the nonreciprocal Kerr effect would be suppressed by using for instance the technique sketched previously, rotation rate sensitivities below $10^{-4}$ deg/hour should be theoretically achievable.

II. EXPERIMENT

A re-entrant fiber Raman gyroscope was implemented experimentally. The fiber (30) used for the sensing loop was of the nonpolarization-preserving type. Although different from the ideal case of a polarization maintaining device described in the theoretical part, a Sagnac interferometer made from a polarization-preserving sensing loop can exhibit the identical reciprocity properties provided adequate polarization control is achieved upon recombination of the signal waves [27].

Figure 9:
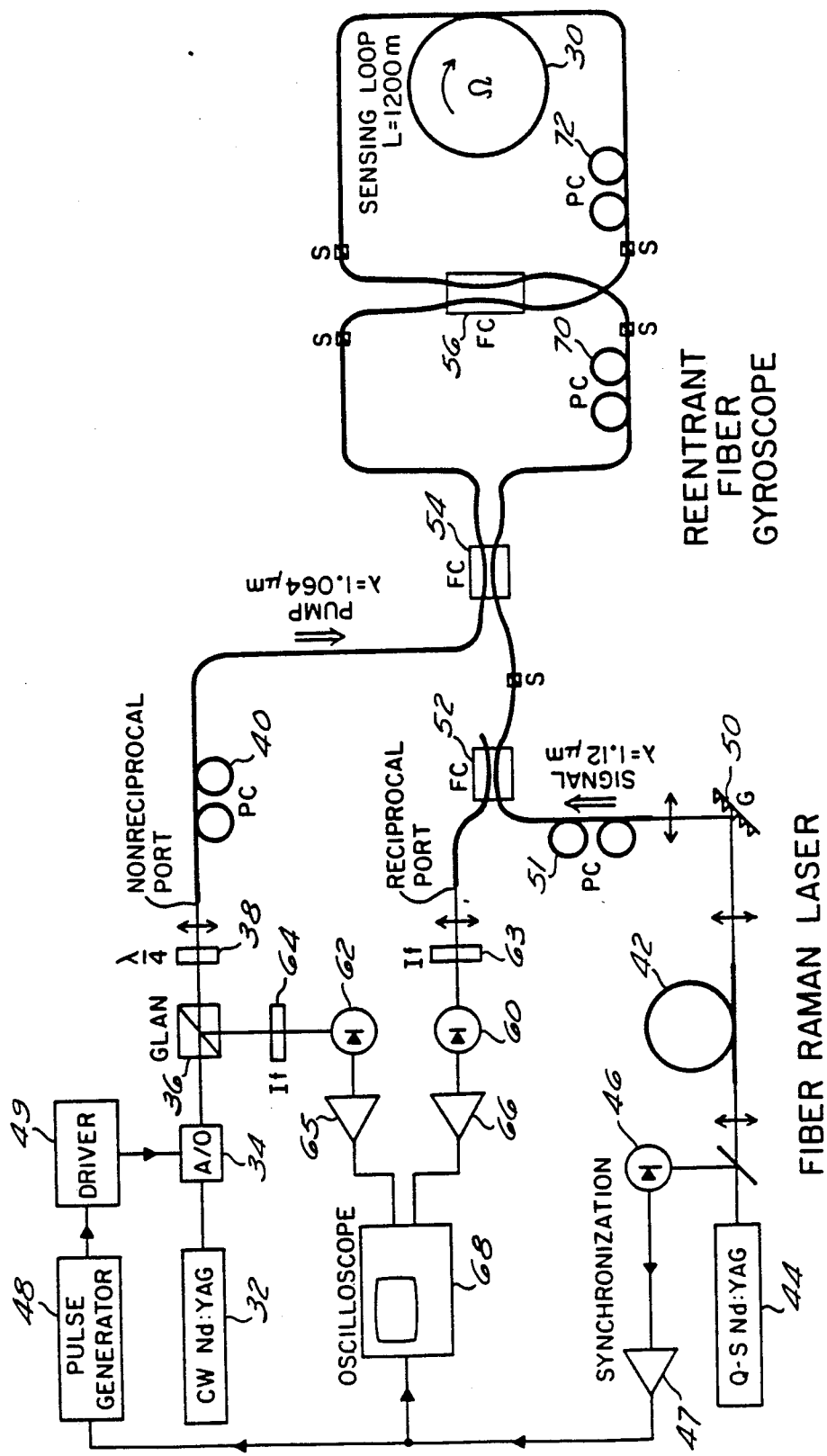
FIG. 9 is a schematic illustration of an embodiment of the invention which was tested.

Experimental setup—The setup used in the experiment is pictured in FIG. 9. The pump wave at $\lambda_p=1.064$ $\mu$m is provided by the $TEM_{00}$ output of a polarized Nd:YAG laser (32) operating in the cw regime. An acousto-optic cell (34) synchronized with the signal pulses modulates the pump output to form square pulses with arbitrary durations. A Glan polarizer (36) and a quarter-wave plate (38) ensure partial optical isolation of the pump source from power backscattered by the fiber system. The pump wave is coupled through the nonreciprocal port of the fiber gyroscope with a $20\times$ microscope objective. An index-matching oil drop is placed between the coupling objective and the fiber end in order to prevent Fresnel reflection and consequently to reduce feedback effect on the pump source (not showing the Figure). A fiber polarization controller (40) [21] is placed at the pump input end in order to optimize the input pump wave polarization; since about half of the pump power is reflected by the system towards this input pump end, such polarization control associated with the optical isolator makes possible to minimize the consequent feedback effect onto the pump source.

The signal at the Raman-shifted wavelength of $\lambda_s=1.12$ $\mu$m is generated by a fiber Raman laser. This laser source is an auxiliary 1200 m-long single-mode fiber (42) loop which is pumped by a Q-switched Nd:YAG laser (44) (300 ns pulsewidth, 1KW peak power) operating at $\lambda_p=1.064$ $\mu$m at the low repetition rate of 100 Hz (a silicon photodetector (46), placed in a beam reflection, generates a signal which passes through an amplifier (47), a pulse generator (48), and a driver (49) to ensure synchronization of the acousto-optic cell (34) modulating the other pump source output). The output Stokes pulses at $\lambda_s=1.12$ $\mu$m, generated in the auxiliary fiber loop (42) by amplification of spontaneous scattering, are filtered by a grating (50), and coupled after passing through a polarizer (not shown in the figure) in the reciprocal port of the fiber gyroscope by $20\times$ microscope objective. The fiber input end acting also as a spatial filter, the coupled signal linewidth $\Delta\lambda_s$ can be reduced from the spectrally large Stokes input to about 2 nm. Depending on the coupling efficiency, the coupled signal peak power can be varied up to about 300 mW in that linewidth. The input signal polarization is optimized through a fiber polarization controller (51) placed at the fiber input end. It was observed that with a polarized input pump wave, the signal Raman gain could be maximized; this has been attributed to the existence of a small degree of polarization dependence of the sensing loop fiber coupler, which affects the pump coupling efficiency in the loop (30), as well as the signal overall loop loss. In addition, a certain amount of stress-induced birefringence in the non-polarization preserving fiber loop (30) is also responsive for a slight dependence of the Raman gain on the input polarization conditions.

In order to be able to monitor the reflected signal coming from the system, a directional fiber coupler (52) [30] with a 50% splitting efficiency is placed at the signal input port. It is well-known [27] that this reflecting output corresponds for the two counterpropagating signal waves to reciprocal optical paths. At the other fiber end of the system, the nonreciprocal signal output is monitored from the portion of the signal wave which is reflected by the Glan polarizer (36) placed in front of the nonreciprocal port. The re-entrant Sagnac interferometer, described in detail in section I-D, is assembled from discrete elements by using capillary-bonded splices (labeled "S") with about 0.2 dB insertion loss.

The re-entrant loop is made from a strand of fiber closed upon itself by a directional fiber coupler (54). The two free ends of the re-entrant fiber loop coupler are spliced to the two output ends of a second fiber coupler (56) which acts as a beam splitter/combiner (BS/C) for both pump and signal waves. The non polarization-preserving fiber (30) used for the re-entrant loop is 1200 m-long, with attenuation coefficients $a_p=1.3$ dB/km, $a_s=1$ dB/km; it has a 5.2 $\mu$m effective core diameter and a cutoff wavelength of $\lambda_c=1.064$ $\lambda$m. From these parameters and eqs. (A8), (A25), the theoretical effective mode overlap areas are $A_{fps}=13.2$ $\lambda m^2$ and $A_{fss}=13.7$ $\lambda m^2$, using a gaussian approximation for the mode envelopes. The fiber couplers (52,54,56) used in the experiment are of the mechanically polished type [30], with an insertion loss of the order of a few percents ($\gamma_{s1}\simeq\gamma_{s2}=0.95$). To the exception of the re-entrant loop coupler (56), the fiber couplers used in the setup were realized with a 25 cm curvature radius, for which the multiplexing effect [25] between the pump and the signal waves is small ($\eta_{p1}\simeq\eta_{s1}=0.5$). The re-entrant loop fiber coupler (56) was realized with a long curvature radius of 4 m, which, by the consequent increase of the interaction length, enhances the effect of multiplexing [25]. With such fiber coupler (56), there exists a tuning position for which the pump coupling ratio is null ($\eta_{p2}=0$) and the signal coupling ratio maximized ($\eta_{s2}=0.73$ in the experiment). As a result, all the pump power is coupled into the fiber loop, which maximizes the Raman gain, while the signal lop loss is minimized. In addition, as pointed out in previous work [10], a null pump coupling ratio prevents the pump wave from recirculating in the loop and interfering with itself, which otherwise would result in gain fluctuations due to pump phase noise [31]. Using a standard coupler for the re-entrant fiber loop, for which the pump power could recirculate in the loop, it was observed that the resulting pump interferences, causing fast pump polarization fluctuations, resulted in a nonreciprocal polarization scrambling of the recirculating output signal. The use of a multiplexer coupler (56) with null pump coupling ratio for the re-entrant loop is then justified not only for consideration of Raman gain stability, but also as a condition for reciprocal operation of the system.

Both reciprocal and nonreciprocal signal outputs are analyzed by germanium photodetectors (60,62) after passing through interference filters (63,64) having a peak transmission at $\lambda_s=1.12$ μm. The outputs of the photodetectors are amplified by amplifiers (65,66), and are then monitored with a storage oscilloscope (68). Polarization matching of the two reflected signal waves is achieved by using fiber polarization controllers (70,72) placed in the re-entrant fiber loop (C2-F3/-C2 in FIG. 3) and in the intermediate loop (C1-F1-C2-F2 in FIG. 3). A first polarization matching is realized by minimizing the output corresponding to the first signal pulse which is reflected by the system and obtained at the nonreciprocal port. This first pulse is reflected by the system and obtained at the nonreciprocal port. This first pulse is the recombination of the two signal pulses which have been rejected by the re-entrant loop coupler (56) and have circulated only in the intermediate loop. By tuning the BS/C coupler (54) to a coupling ratio value of 0.5, and by matching the signal polarizations through the intermediate loop polarization controller (70), the signal output can be nulled. The null output at this port is explained by the fact that, in this transit along the intermediate loop, one of the signal waves (CCW in the figure) has achieved two cross-couplings through the BS/C coupler (54), while the other signal wave (CW in the figure) has achieved two straight-through crossings in this coupler. As a result there exists a relative phase shift $\Delta\phi_{NR}$ between the two waves which, because of the difference in the coupler normal modes loss, corresponds to slightly less than a half cycle (i.e. $\Delta\phi_{NR}\approx\pi$) [32]. The same nulling of the nonreciprocal in the re-entrant fiber loop, by using the re-entrant fiber loop polarization controller (72). This operation actually consists in making reciprocal the CW and CCW optical paths around the reentrant fiber loop (30). A slight amount of nonreciprocity in the sensing loop (30) actually remains from unperfect polarization matching, random polarization mode-coupling, unsolicited fiber twist (nonreciprocal circular birefringence), influence of the earth magnetic field (Faraday effect) and temperature gradients. However, this effects were supposedly too small to be detected in the experimental conditions.

Figure 10:
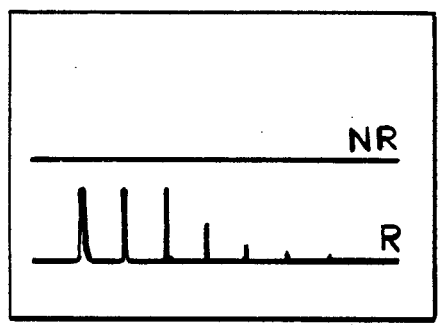
FIG. 10 is a representation of oscilloscope tracings of the output signals obtained at the reciprocal and nonreciprocal ports of the embodiment shown in FIG. 9 in the absence of pump power.
Figure 10:
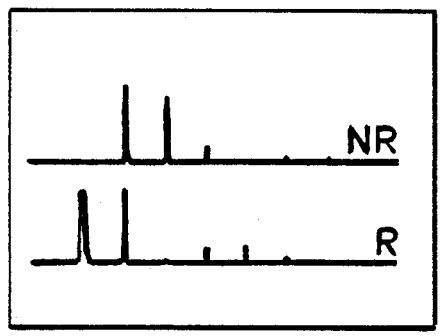

Operation of the re-entrant gyroscope in the passive and the active modes—When no pump power is coupled into the system, a signal pulse train is obtained at the reciprocal port whose envelope decays exponentially with the optical delay. The input signal power has then to be maximized in order to obtain the largest possible number of recirculations at the system output. FIG. 10 shows oscilloscope traces of the output signals obtained at the reciprocal (R) and nonreciprocal (NR) ports. The system being at rest ($\Omega=0$) and the polarization matching optimized, the NR port output is null, whereas the R port output shows the expected decaying pulse train (FIG. 10(a)). In the latter, the intensities of the two first pulses are above the detector saturation level; away from this saturation regime, the intensity ratio of two consecutive pulses corresponds to an overall loop loss of about 3 dB, as seen in the figure. Due to this relatively fast decay, only 7 signal recirculations are obtained in the passive mode.

In presence of rotation (FIG. 10-(b), the R output shows that a sinusoidal modulation of the signal envelope occurs. Due to the power decay, only two periods of the rotation-induced modulation are visible in this output. From eqs. (70), (71) with a loop diameter of $D=18$ cm and a measured 54 KHz modulation frequency, the rotation rate is evaluated to be 0.49 rad/sec, in agreement with the estimated applied rotation. As seen in the figure, the NR port output shows also a decaying pulse train with sinusoidal modulation, which is delayed by a half cycle with respect to the R port output, as predicted by the theory. In this passive mode of operation, the number of signal recirculations being relatively small, the dynamic range of the re-entrant gyroscope is severely limited.

In the active mode, a square pump pulse of arbitrary duration is coupled through the NR port of the system (see FIG. (3)). The leading edge of the pump pulse is synchronized with the signal-generating Raman laser (see FIG. (9)) so that it is advanced by about 6 μs with respect to the input signal pulse; by the time the signal pulse is coupled into the fiber gyroscope R port, the pump pulse occupies the whole re-entrant fiber loop, which garantees gain reciprocity. With the aforementioned system parameters, an unpolarized Raman gain coefficient $g_r=6.9\times10^{-14}$ m/W evaluated from ref. [15], and using eq. (63), the calculated critical pump power for which the loop loss is compensated by the Raman gain is $P_p^{in,crit}=135$ m/W. In order to ensure an undepleted pump regime, the recirculating signal power has to be decreased to a level at least one order of magnitude below the pump power level. With a loop coupling ratio $\eta_{s2}\approx0.73$, the maximum input signal for linear amplification regime is then evaluated to be 50 mW.

Figure 11:
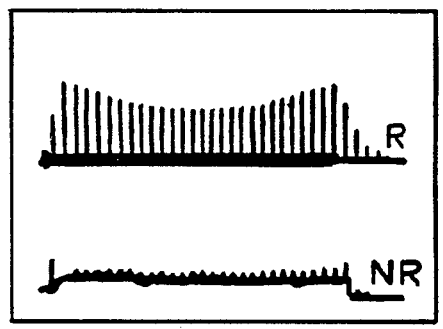
FIG. 11 is a representation of the oscilloscope traces of FIG. 10 in the presence of pump power.
Figure 11:
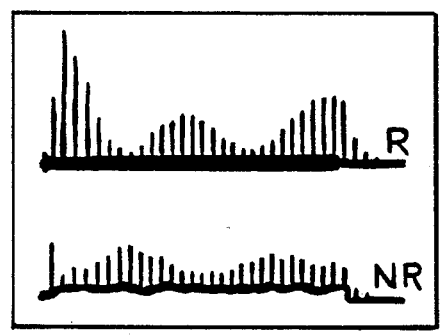
Figure 11:
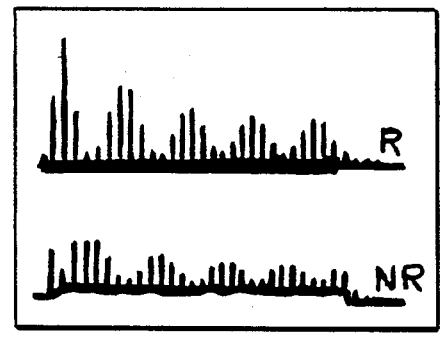

FIG. 11 shows oscilloscope traces of the signals at $\lambda=1.12$ μm detected at the R and the NR output ports, when a 190 μs-long pump pulse having the required critical power is coupled in the system. When the system is at rest (FIG. 11-(a)), the R port output is made of a pulse train with constant amplitude, as long as the pump is on. The depression of the envelope level which is visible in the figure is due to pump power fluctuations about the critical value. When the pump is turned off (end of the pulse train of the R output in FIG. 11-(a)), a fast decay of the recirculating pulses occurs, causing the signal to vanish. The NR port output shown in the same figure has a square pulse background which is due to a certain amount of backscattered pump power passing trough the interference filter. In this NR output, small residual output pulses can be observed, showing that, in the active mode of operation, the polarization control is not as efficient as it is in the passive mode. This was attributed to a modulation of the signal polarization by the pump, through the pump-induced optical Kerr effect. Then, when the pump is coupled into the fiber loop, the two output signal polarizations are changed, which requires a polarization matching readjustment. As it was observed, the polarization matching in the active mode was less efficient as in the passive mode. This fact was attributed to a nonreciprocal pump-induced OKE, caused by (a) the unequal pump power splitting in the two propagation directions (asymmetrical pumping), and (b) the occurrence of pump power fluctuations, of the order of the loop transit time induced by optical feedback. As seen in the theoretical part, both of these effects result in a nonreciprocal OKE-induced phase shift which, in particular, cause polarization mismatch between the two signals.

When rotation of the sensing loop occurs, the output signal pulse train at the R port shows a sinusoidal modulation, as seen in FIGS. 11-(a) and (b). The same impulse response, shifted by a half cycle is visible at the NR port. The modulation frequencies corresponding to the two cases are 12.9 KHz and 24.4 KHz, which with the system parameters correspond to rotation rates of 0.11 rad/sec and 0.22 rad/sec, in good agreement with the estimated applied rotations. The R port outputs show that, in presence of rotation and Raman amplification in the loop, a fairly large amplitude modulation of the signal pulse envelope can be observed, which is actually limited by the polarization control of the system. As such, this experiment constitutes the first demonstration of an active fiber gyroscope, where the Sagnac effect is magnified by achieving many lossless signal recirculations in the sensing loop, through Raman amplification. Because of pump power fluctuations induced by optical feedback in the pump source caused by the reflection by the system of about half of the input pump power, sizeable Raman gain fluctuations causing output envelope unstability limited the achievable numbers of recirculations to small amounts. More efficient optical isolation of the pump source, utilizing for instance a nonreciprocal optical element, alongwith an electronical feedback control on the pump intensity, should make possible in future work to achieve the very large number of signal recirculations already demonstrated with the active recirculating delay line [10]. In such conditions, several orders of magnitude in rotation rate sensitivity should be gained.

CONCLUSION

The first experimental demonstration of an active, re-entrant fiber gyroscope is reported. In this alternative to rotation sensing which uses pulsed signals, the nonreciprocal phase shift induced by the Sagnac effect is magnified by having two signal waves recirculating many times in the sensing loop. Direct optical amplification by Raman scattering has been implemented as a means to compensate for the loop loss and thus to maximize the number of signal recirculations. The re-entrant gyroscope has been realized in an all-fiber, nonpolarization-maintaining version utilizing integrated fiber components. The multiplexing property of the re-entrant loop fiber coupler has been increased so that to suppress the effect of pump phase noise and consequent gain and polarization fluctuations in the loop. Due to a sizeable amount of residual optical feedback in the pump source causing Raman gain fluctuations, the active operation of the system was limited to short durations, allowing only the detection of relatively large rotation rates.

A theoretical analysis of the active re-entrant Raman gyroscope, which involves bidirectional Raman scattering, Rayleigh scattering and optical Kerr effect, has been presented. It has been shown that ideally, the system should be polarization-preserving, with both the pump and the signal porpagating into the same polarization modes. Various causes of nonreciprocity, which set practical limitations to the system performance, have been analysed and the magnitude of their respective effects evaluated.

It has been shown that concurrent amplification of the Stokes and the Rayleigh-scattered scattered noises causes a nearly quadratic decay with the number of signal recirculations of the system output SNR. With optimized parameters, a SNR of 10 dB after about $10^6$ signal recirculations has been evaluated as representing a practical limit. To this maximum number of signal recirculations sets corresponds a minimum detectable Sagnac phase shift and rotation rate. However, two causes of nonreciprocity, namely Rayleigh backscattering and optical Kerr effect, have been shown to induce a rotation rate error, which sets a lower bound to the rotation rate sensitivity achievable in practice. By choosing a wavelength for which the fiber loss due to Rayleigh scattering is small (i.e. $\lambda_s = 1.55$ $\mu$m), and by reducing the signal pulsewidth (i.e. $\tau_s = 1$ ns for instance), the phase error due to Rayleigh scattering has been shown to be made negligible. On the other hand, the reduction of the nonreciprocal phase shift due to the self-induced optical Kerr effect has been shown to be limited by the possibility of equalizing accurately the amount of recirculating signal power. A way to cancel the self-induced OKE nonreciprocity, by using the pump-induced OKE has been suggested, which in theory would increase the system performance. In future work, orders of magnitude in rotation rate sensitivity should be gained by achieving a necessary Raman gain stabilization over long optical delays, which involves adequate control of the pump source intensity, as well as optical isolation from the fiber system. Nonreciprocity due to polarization wandering should be suppressed by using a polarization-maintaining device. Finally, very large numbers of signal recirculations could be achieved by using short optical pulses at a wavelength where the fiber dispersion is minimized. The use for the signal of optical solitons [33] for which self-OKE compensates for fiber dispersion might prove in the future to be an attractive alternative.

Assuming optimized parameters, and accounting for the aforementioned SNR limit and nonreciprocity sources, it has been shown that, with large loop diameters, very high rotation rate sensitivities (i.e. down to less than $10^{-3}$ deg/hour) should be theoretically possible. Like the ring laser and the passive resonator gyroscopes, the re-entrant fiber Raman gyroscope has a built-in linear scale factor with frequency readout, but is free from frequency locking. The specific features, advantages and performance potential of the re-entrant fiber Raman gyroscope makes it suitable for applications in fundamental physics, for instance geophysics and cosmology.

U.S. patent application Ser. Nos. 699,853, filed 2/8/85, and 828,782, filed 2/12/86 are incorporated herein by reference.

APPENDIX

Derivation of the signal fields propagation equations.

Raman scattering—Using eqs. (1)-(3), the nonlinear polarization $P_{NL}'(\omega_s)$ in eq. (6) writes, for the forward travelling signal wave:

$$P_{NL}'(\omega_s) = 4\pi\epsilon_0(4\chi_R^{(3)})\frac{3}{2} E_p(E_p^* \cdot E_s') = \quad (A1)$$

$$24\pi\epsilon_0\chi_R^{(3)}\{E_p'(E_p'^* \cdot E_s') + E_p''(E_p''^* \cdot E_s') +$$

$$E_p'(E_p''^* \cdot E_s') + E_p''(E_p'^* \cdot E_s')\} =$$

$$24\pi\epsilon_0\chi_R^{(3)}\frac{\psi_p^2\psi_s}{N_p^2 N_s} e^{-i\omega_s t}\hat{J}(z)\hat{\Gamma}^+(z)B'(z)$$

with $B' = (B_x', B_y')$ being the signal complex amplitude, and $\hat{\Gamma}^+(z)$ being a matrix with the following coefficients:

$$\hat{\Gamma}_{11}^+(z) = |A_x'|^2 + |A_x''|^2 + A_x' A_x''^* e^{2i\beta_p^x(z-\frac{L}{3})} + \quad (A2)$$

$$A_x'^* A_x'' e^{-2i\beta_p^x(z-\frac{L}{3})}$$

$$\hat{\Gamma}_{12}^+(z) = A_x' A_y'^* e^{i\Delta\beta_1 z} + A_x'' A_y''^* e^{i(\Delta\beta_2 z + \Delta\beta_p L)} + \quad (A3)$$

$$A_x' A_y''^* e^{i(\Delta\beta_3 z - \beta_p^y L)} + A_x'' A_y'^* e^{i(\Delta\beta_4 z + \beta_p^x L)} = \hat{\Gamma}_{21}^{+*}(z)$$

$$\hat{\Gamma}_{22}^+(z) = |A_y'|^2 + |A_y''|^2 + A_y' A_y''^* e^{2i\beta_p^y(z-\frac{L}{3})} + \quad (A4)$$

$$A_y'^* A_y'' e^{-2i\beta_p^y(z-\frac{L}{3})}$$

with $\Delta\beta_1 = \Delta\beta_p - \Delta\beta_s$, $\Delta\beta_2 = -\Delta\beta_p - \Delta\beta_s$, $\Delta\beta_3 = \sigma\beta_p - \Delta\beta_s$, $\Delta\beta_4 = -\sigma\beta_p - \Delta\beta_s$, $\delta\beta_p = \beta_p^x - \Delta_p^y$, and $\sigma\beta_p = \beta_p^x + \beta_p^y$. The signal Jones matrix $\hat{J}(z)$ in eq. (A1) is, by definition:

$$\hat{J}(z) = \begin{pmatrix} e^{i\beta_0 z z} & 0 \\ 0 & e^{i\beta_3 y z} \end{pmatrix} \quad (A5)$$

Replacing expression (3) of the signal field in propagation equation (5), and using the slowly varying approximation $d^2 B_l/dz^2 \ll 2\beta'$, $dB_l/dz$ ($l=x,y$), one obtains the following vector equation:

$$\psi_s \frac{dB'(z)}{dz} \approx i\frac{\omega_s N_s}{2\epsilon_0 c n_s} e^{i\omega_s t}\hat{J}^{-1}(z)\hat{P}_{NL}'(\omega_s) \quad (A6)$$

Multiplying both sides of eq. (A6) by $\psi_s$, using eq. (A1) and integrating over the fiber cross-sectional area $\Sigma$, it is found:

$$\frac{dB'(z)}{dz} = i\frac{96\pi^2\omega_s\chi_R^{(3)}}{n_p n_s c^2 A_{fps}}\hat{\Gamma}^+(z)B'(z) \quad (A7)$$

where $A_{fps}$ is a mode overlap area defined by [11]:

$$A_{fps} = \frac{\iint_\Sigma \psi_p^2(r,\theta)r dr d\theta \cdot \iint_\Sigma \psi_s^2(r,\theta)r dr d\theta}{\iint_\Sigma \psi_p^2(r,\theta)\psi_p^2(r,\theta)r dr d\theta} \quad (A8)$$

The same procedure as used in the forward signal case, but using the backward travelling signal field $E_s''(r, \theta, z, t)$ as defined in eq. (4) leads to the propagation equation for the backward signal complex amplitude:

$$\frac{dB''(z)}{dz} = -i\frac{96\pi^2\omega_s\chi_R^{(3)}}{n_p n_s c^2 A_{fps}}\hat{\Gamma}^-(z)B''(z) \quad (A9)$$

with $\hat{\Gamma}^-(z)$ defined by:

$$\hat{\Gamma}_{11}^-(z) = \hat{\Gamma}_{11}^+(z) \quad (A10)$$

$$\hat{\Gamma}_{12}^-(z) = A_x' A_y'^* e^{-i(\Delta\beta_2 z + \Delta\beta_0 L)} + A_x'' A_y''^* e^{i[\Delta\beta_1(L-z)]} + \quad (A11)$$

$$A_x' A_y''^* e^{i[\Delta\beta_4(L-z)+\beta_p^x L]} + A_x'' A_y'^* e^{i[\Delta\beta_3(L-z)-\beta_p^y L]} = \hat{\Gamma}_{21}^{-*}(z)$$

$$\hat{\Gamma}_{22}^-(z) = \hat{\Gamma}_{22}^+(z) \quad (A12)$$

Optical Kerr effect—For clarity, the time dependence of the field amplitudes is omitted. Developing the right-hand side of eq. (21) and keping only the nonzero elements of $\chi_K^{(3)}$, it is found:

$$P_{NL}(\omega_s) = 24\pi\epsilon_0 \frac{\psi_s}{N_s} e^{-i\omega_s t}\hat{P}(z)\{\hat{J}_s(z)B'(z) + \hat{J}_s(L-z)B''(z)\} \quad (A13)$$

with:

$$\hat{P}(z) = \begin{pmatrix} \alpha_{xx}\chi_{1111} + \alpha_{yy}\chi_{1122} \alpha_{xy}\chi_{1122} + \alpha_{yx}\chi_{1212} \\ \alpha_{xy}\chi_{2121} + \alpha_{yx}\chi_{2211} \alpha_{xx}\chi_{2112} + \alpha_{yy}\chi_{2222} \end{pmatrix} \quad (A14)$$

and with $i, j = x, y$ and $q = p, s$:

$$\alpha_{ij} = \alpha_{ij}^s + 2\alpha_{ij}^p \quad (A15)$$

$$\alpha_{ij}^q = \frac{\psi_q^2}{N_q^2} E_q^i E_q^{*j} = \quad (A16)$$

$$\frac{\psi_q^2}{N_q^2} (E_q'^i E_q'^{*j} + E_q'^i E_q''^{*j} + E_q''^i E_q'^{*j} + E_q''^i E_q''^{*j})$$

Assuming the pump to be linearly polarized along the $ox$ direction (i.e. $A_y' = A_y'' = 0$), keeping only the phase-matched terms in the development (A16), and using eq. (5), the propagation equation of the signal waves take the form:

$$\frac{dB'(z)}{dz} \approx i\hat{\phi}^+(z)B'(z) \quad (A17)$$

$$\frac{dB''(z)}{dz} \approx -i\hat{\phi}^-(z)B''(z) \quad (A18)$$

with $\hat{\phi}^\pm$ being matrices defined by:

$$\hat{\phi}_{11}^+ = C_p\chi_{1111}(|A_x'|^2 + |A_x''|^2) + \quad (A19)$$

$$C_s\chi_{1111}(|B_x'|^2 + 2|B_x''|^2) + C_s(\chi_{1122} + \chi_{1221})(|B_y'|^2 + |B_y''|^2)$$

$$\hat{\phi}_{22}^+ = C_p\chi_{2112}(|A_x'|^2 + |A_x''|^2) + \quad (A20)$$

$$C_s\chi_{2222}(|B_y'|^2 + 2|B_y''|^2) + C_s(\chi_{2211} + \chi_{2112})(|B_x'|^2 + |B_x''|^2)$$

$$\hat{\phi}_{11}^- = C_p\chi_{1111}(|A_x'|^2 + |A_x''|^2) + \quad (A21)$$

$$C_s\chi_{1111}(2|B_x'|^2 + |B_x''|^2) + C_s(\chi_{1122} + \chi_{1221})(|B_y'|^2 + |B_y''|^2)$$

$$\hat{\phi}_{22}^- = C_p\chi_{2112}(|A_x'|^2 + |A_x''|^2) + \quad (A22)$$

$$C_s\chi_{2222}(2|B_y'|^2 + |B_y''|^2) + C_s(\chi_{2211} + \chi_{2112})(|B_x'|^2 + |B_x''|^2)$$

the other matrix elements being null. In eqs. (A19)-(A22), the following definitions have been introduced:

$$C_p = \frac{96\pi^2\omega_s}{n_p n_s c^2 A_{fps}} \quad \text{(A23)}$$

$$C_s = \frac{48\pi^2\omega_s}{n_s^2 c^2 A_{fss}} \quad \text{(A24)}$$

with:

$$A_{fss} = \frac{\left(\iint_\Sigma \psi_s^2(r,\theta) r dr d\theta\right)^2}{\iint_\Sigma \psi_s^4(r,\theta) r dr d\theta} \quad \text{(A25)}$$

The accumulated phases $\hat{\Phi}_K^\pm$ in eqs. (24), (25) are given by the integrals of the phases $\hat{\phi}^\pm$ in eqs. (A17), (A18). The signal waves are assumed to be confined in short optical pulses of durations $\tau_s < < \tau$, which allows an approximation of the integrals corresponding to the signal cross-OKE. Using eqs. (A19)-(A22), the accumulated phases $\hat{\Phi}_K^\pm$ take the form:

$$\hat{\Phi}_K^+(L,t) = \int_0^L \{\hat{\phi}_{PK}^+(z,t) + \hat{\phi}_{SK}^+(z,t)\} dz + \quad \text{(A26)}$$

$$\hat{\phi}_{CK}^+(L/2,t) V\tau_s = \hat{\Phi}_{PK}^+(L,t) + \hat{\Phi}_{SK}^+(L,t) + \hat{\Phi}_{CK}^+(L,t)$$

$$\hat{\Phi}_K^-(0,t) = \int_0^L \{\hat{\phi}_{PK}^-(z,t) + \hat{\phi}_{SK}^-(z,t)\} dz + \quad \text{(A27)}$$

$$\hat{\phi}_{CK}^-(L/2,t) V\tau_s = \hat{\Phi}_{PK}^-(0,t) + \hat{\Phi}_{SK}^-(0,t) + \hat{\Phi}_{CK}^-(0,t)$$

$$B_{x'}(z,t) = \sqrt{T_s(z)} \times \exp\left\{\frac{g_r}{2Af}\left[P_0'(0,t-\tau) L_f(z) + \frac{L}{2\tau} \int_{t-2\tau}^{t-2\tau+2z/V} T_p\left[\frac{V}{2}(t-t')\right]P_0''(L,t')dt'\right]\right\} B_{x'}(0,t-\tau) \quad \text{(A32)}$$

$$B_{y'}(z,t) = \sqrt{T_s(z)} \; B_{y'}(0,t-\tau) \quad \text{(A33)}$$

$$B_{x''}(z,t) = \sqrt{T_s(L-z)} \times \quad \text{(A34)}$$

$$\exp\left\{\frac{g_r}{2Af_{ps}}\left[P_0''(L,t=\tau) L_f(L-z) + \frac{L}{2\tau} \int_{t-2\tau}^{t-2\tau+2(L-z)/V} T_p\left[\frac{V}{2}(t-t')\right]P_0'(0,t')dt'\propto 0\right]\right\} B_{x''}(0,t-\tau)$$

$$B_{y''}(z,t) = \sqrt{T_s(L-z)} \; B_{y''}(L,t-\tau) \quad \text{(A35)}$$

The integrands in eqs. (A26), (A27) have for respective expressions:

$$\hat{\phi}_{PK}^+(z,t) = C_p \begin{pmatrix} \chi_{1111} & 0 \\ 0 & \chi_{1221} \end{pmatrix} \left\{ \left|A_{x'}\left(z,t-\frac{L-z}{V}\right)\right|^2 + \left|A_{x''}\left(z,t-\frac{L-z}{V}\right)\right|^2 \right\} \quad \text{(A28)}$$

$$\hat{\phi}_{PK}^-(z,t) = C_p \begin{pmatrix} \chi_{1111} & 0 \\ 0 & \chi_{1221} \end{pmatrix} \{|A_{x'}(z,t-z/V)|^2 + |A_{x''}(z,t-z/V)|^2\} \quad \text{(A29)}$$

$$\hat{\phi}_{SK}^\pm(z,t) = C_s \begin{pmatrix} \chi_{1111} & 0 \\ 0 & \chi_{2211} + \chi_{2112} \end{pmatrix} C_x(t) + \quad \text{(A30)}$$

$$C_s \begin{pmatrix} \chi_{1122} + \chi_{1221} & 0 \\ 0 & \chi_{2222} \end{pmatrix} C_y(t)$$

$$\hat{\phi}_{CK}(t) = C_s \begin{pmatrix} 2\chi_{1111} & 0 \\ 0 & \chi_{2211} + \chi_{2112} \end{pmatrix} C_x(t) + \quad \text{(A31)}$$

$$C_s \begin{pmatrix} \chi_{1122} + \chi_{1221} & 0 \\ 0 & 2\chi_{2222} \end{pmatrix} C_y(t)$$

where $C_{x,y}(t) \equiv |B'_{x,y}(z,t)|^2$ for $\hat{\phi}_{SK}^+(z,t)$ and $\hat{\phi}_{CK}^-(z,t)$, and $C_{x,y}(t) \equiv |B_{x,y}|B_{x,y}''(z,t)|^2$ for $\hat{\phi}_{XK}^-(z,t)$ and $\hat{\phi}_{CK}^+(z,t)$, respectively, with the following definitions of the signal amplitudes:

Using eqs. (14), (26), (27), (A28)-(A35), integration in eqs. (A26), (A27) yields:

$$\hat{\Phi}_{PK}^+(L,t) = \gamma_p C_p \begin{pmatrix} \chi_{1111} & 0 \\ 0 & \chi_{1221} \end{pmatrix} \times \left\{ \eta_p P_p^{in}(t-\tau)L_{fp} + (1-\eta_p) < T_p\left[\frac{V}{2}(t-t')\right]P_p^{in}(t') > 2\tau L \right\} \quad \text{(A36)}$$

$$\hat{\Phi}_{PK}^-(L,t) = \gamma_p C_p \begin{pmatrix} \chi_{1111} & 0 \\ 0 & \chi_{1221} \end{pmatrix} \times \left\{ (1-\eta_p) P_p^{in}(t-\tau)L_{fp} + \eta_p < T_p\left[\frac{V}{2}(t-t')\right]P_p^{in}(t') > 2\tau L \right\} \quad \text{(A37)}$$

-continued $$\hat{\Phi}^{\pm}_{SK}(t) = C_s \begin{pmatrix} \chi_{1111} & 0 \\ 0 & \chi_{2211} + \chi_{2112} \end{pmatrix} I_x^{\pm}(t) + C_s \begin{pmatrix} \chi_{1122} + \chi_{1221} & 0 \\ 0 & \chi_{2222} \end{pmatrix} I_y^{\pm}(t) \tag{A38}$$

$$\hat{\Phi}^{\pm}_{CK}(t) = C_s \begin{pmatrix} 2\chi_{1111} & 0 \\ 0 & \chi_{2211} + \chi_{2112} \end{pmatrix} J_x^{\pm}(t) + C_s \begin{pmatrix} \chi_{1122} + \chi_{1221} & 0 \\ 0 & 2\chi_{2222} \end{pmatrix} J_y^{\pm}(t) \tag{A39}$$

with:

$$I_x^+(t) = |B_x'(0,t-\tau)|^2 \int_0^L T_s(z) \times \exp\left\{\frac{\gamma_p g_r}{A_{fps}}\left[\eta_p P_p^{in}(t-\tau)L_{fp}(z) + z(1-\eta_p) < T_p\left[\frac{V}{2}(t-t')\right]P_p^{in}(t') > 2z/V\right]\right\}dz \tag{A40}$$

$$I_x^-(t) = |B_x''(L,t-\tau)|^2 \int_0^L T_s(L-z) \times$$ 
(A41)

$$\exp\left\{\frac{\gamma_p g_r}{A_{fps}}\left[(1-\eta_p)P_p^{in}(t-\tau)L_{fp}(L-z) + (L-z)\eta_p < T_p\left[\frac{V}{2}(t-t')\right]P_p^{in}(t') > 2(L-z)/V\right]\right\}dz$$

$$I_y^+(t) = L_{fs}|B_y'(0,t-\tau)|^2 \tag{A42}$$

$$I_y^-(t) = L_{fs}|B_y''(L,t-\tau)|^2 \tag{A43}$$

$$J_x^+(t) = V\tau_s\sqrt{T_s}\ |B_x'(0,t-\tau)|^2 \times \exp\left\{\frac{\gamma_p g_r}{A_{fps}}\left[\eta_p P_p^{in}(t-\tau)L_{fp}\left(\frac{L}{2}\right) + (1-\eta_p) < T_p\left[\frac{V}{2}(t-t')\right]P_p^{in}(t') > r\frac{L}{2}\right]\right\} \tag{A44}$$

$$J_x^-(t) = V\tau_s\sqrt{T_s}\ |B_x''(L,t-\tau)|^2 \times \exp\left\{\frac{\gamma_p g_r}{A_{fps}}\left[(1-\eta_p)P_p^{in}(t-\tau)L_{fp}\left(\frac{L}{2}\right) + \eta_p < T_p\left[\frac{V}{2}(t-t')\right]P_p^{in}(t') > r\frac{L}{2}\right]\right\} \tag{A45}$$

$$J_y^+(t) = V\tau_s\sqrt{T_s}\ |B_y'(0,t-\tau)|^2 \tag{A46}$$

$$J_y^-(t) = V\tau_s\sqrt{T_s}\ |B_y''(L,t-\tau)|^2 \tag{A47}$$

and $L_{fq}=(1-T_q)/\alpha_q$ (q=p,s).

In the case on a constant pump power, i.e. $P_p^{in}$=constant, the following expressions can be obtained from eqs. (A40), (A41), (A44), (A45):

$$\hat{\Phi}^+_{PK}(t) = \hat{\Phi}^-_{PK}(t) \tag{A48}$$

$$L_x(t) = I_x^+(t) - I_x^-(t) = P_{sx}^+(t-\tau)\int_0^L T_s(z)\exp\left\{\frac{\gamma_p g_r P_p^{in}}{A_{fps}}L_{fp}(z)[\eta_p + (1-\eta_p)T_p(L-z)]\right\}dz - \tag{A49}$$

$$P_{sx}^-(t-\tau)\int_0^L T_s(z)\exp\left\{\frac{\gamma_p g_r P_p^{in}}{A_{fps}}L_{fp}(z)[1-\eta_p + \eta_p T_p(L-z)]\right\}dz$$

$$M_x(t) = J_x^+(t) - J_x^-(t) = V\tau_s\sqrt{T_s}\ P_{sx}^+(t-\tau)\exp\left\{\frac{\gamma_p g_r P_p^{in}}{A_{fps}}L_{fp}(L/2)[\eta_p + (1-\eta_p)\sqrt{T_p}\ ]\right\} - \tag{A50}$$

$$V\tau_s\sqrt{T_s}\ P_{sx}^-(t-\tau)\exp\left\{\frac{\gamma_p g_r P_p^{in}}{A_{fps}}L_{fp}(L/2)[1-\eta_p + \eta_p\sqrt{T_p}\ ]\right\}$$

REFERENCES

[1] V. Vali and R. W. Shorthill, "Fiber ring interferometer," Appl. Opt., 15, 1099 (1976).

[2] S. Ezekiel and S. R. Balsamo, "Passive ring resonator laser gyroscope," Appl. Phys. Lett., 30, 478 (1977).

[3] J. L. Davis and S. Ezekiel, "Techniques for shot-noise-limited inertial rotation measurement using a multiturn fiber Sagnac interferometer," Proceedings of SPIE, 157, 131 (1978).

[4] R. F. Cahill and E. Udd, "Phase nulling fiber optic laser gyro," Opt. Lett., 4, 93 (1979).

[5] H. C. Lefevre, Ph. Graindorge, H. J. Arditty, S. Vatoux and M. Papuchon, "Double closed-loop hybrid fiber gyroscope using digital phase ramp," Proceedings of OFS 3, Post-deadline paper PSD 7, San Diego (1985).

[6] B. Y. Kim and H. J. Shaw, "Phase-reading, all-fiber-optic gyroscope," Opt. Lett., 9, 378 (1984).

[7] H. Arditty, H. J. Shaw, M.Chodorow and R. Kompfner, "Re-entrant fiberoptic approach to rotation sensing," Proceedings of SPIE, 157, 138 (1978).

[8] G. A. Pavlath and H. J. Shaw, "Re-entrant fiber optic rotation sensors," Fiber-optic rotation sensors and related technologies, edited by S. Ezekiel and H. J. Arditty, Springer-Verlag, New York, 1982, p. 364.

[9] R. H. Stolen, E. P. Ippen, "Raman gain in glass optical waveguides," Appl. Phys. Lett., Vol. 22, No. 6, 276 (1973).

[10] E. Desurvier, N. Digonnet and H. J. Shaw, "Theory and Implementation of a Raman active fiber delay line," J. Lightwave Technol., Vol. LT-4, No. 4., p. 426 (1986).

[11] R. H. Stolen and J. E. Bjorkholm, "Parametric Amplification and frequency conversion in optical fibers," IEEE Journ. of Quantum Electron., Vol. QE-18, No. 7, 1062 (1982).

[12] R. H. Stolen, "Polarization effects in fiber Raman and Brillouin lasers," IEEE Journ. of Quantum Electron., QE-15, No. 10, 1157 (1979).

[13] N. Bloembergen, in "Nonlinear optics," W. A. Benjamin Inc., London 1965.

[14] Y. Aoki, S. Kishida, H. Honmor, U. Washio and N. Sugimoto, "Efficient backward and forward pumping cw Raman amplification for InGaAsP laser light in silica fibres," Electron. Lett. Vol. 19, No. 16, 620 (1983).

[15] M. Kanazawa, T. Nakashima and S. Seikai, "Raman amplification in 7.6–1.5$\mu$ spectral region in polarization-preserving optical fibers," J. Opt. Soc. Am. B., Vol. 2, No. 4, 515 (1985).

[16] E. Desurvire, M. Tur and H. J. Shaw, "Signal-to-noise ratio in Raman active fiber system: applications to recirculating delay lines," Journal of Lightwave Tech., Vol. LT-4, No. 5, 560 (1986).

[17] P. D. Maker and R. W. Terhune, "Study of optical effects due to an induced polarization third order in the electric field strength," Phys. Rev., Vol. 137, No. 3A, A801 (1965).

[18] A. R. Chraplyvy, D. Marcuse and P. Henry, "Carrier-induced phase noise in angle-modulated optical fiber systems," Journal of Lightwave Tech., Vol. LT-2, No. 1, 6 (1984).

[19] K. Shimoda, H. Takahashi and C. H. Townes, "Fluctuations in amplifications of quanta with application to maser amplifiers," J. Phys. Soc. Japan, Vol. 12, No. 6, p. 686 (1957).

[20] A. Yariv, "Quantum electronics," 2nd Edition, New York: Wiley, 1967, p. 975.

[21] C. C. Cutler, S. A. Newton and H. J. Shaw, "Limitations of rotation sensing by scattering," Opt. Lett., Vol. 5, No. 11, 489 (1980).

[22] J. E. Midwinter, Optical fibers for transmission, New York: J. Wiley & Sons (1979).

[23] E. Desurvier, M. Digonnet and H. J. Shaw, "Raman amplifications of recirculating pulses in a reentrant fiber loop," Opt. Lett., Vol 10, No. 2, 83 (1985).

[24] P. Ulrich, "Polarization and depolarization in the fiber-optic gyroscope," in "Fiber optic rotation sensors and related technologies, " Vol. 32, p. 52. Springer-Verlag: New York, 1982.

[25] M. Digonnet and H. J. Shaw, 37 Wavelength multiplexing in single-mode fiber couplers," Appl. Opt., Vol. 22, No. 3., 486 (1983).

[26] R. Born and E. Wolf, Principles of Optics, p. 544, Pergamon Press, 6th Ed. New York (1980).

[27] S. Ezekieland H. J. Arditty, "Fiber optica rotation sensors. Tutorial Review," in Fiber Optic Rotation Sensors and Related Technologies, Vol. 32, Springer-Verlag, New York, 1982.

[28] D. Cotter, "Observation of stimulated brillouin scattering in low-loss silica fibre at 1.3 $\mu$m," Elect. Lett., Vol. 18, No. 12, 495 (1982).

[29] H. C. Lefevre, "Single-mode fibre fractional wave devices and polarization controllers," Electron. Lett., Vol. 16, No. 20, 778 (1980).

[30] R. A. Bergh, G. Kotler and H. J.Shaw, "Single-mode fibre optic directional coupler," Electron. Lett. Vol. 16, No. 7, 760(1980).

[31] M. Tur, B. Moslehi and J. W. Goodman, "Theory of laser phase noise in recirculating fiber-optic delay lines," IEEE Journ. of Lightwave Tech., Vol. LT-3, No. 1, 20 (1985).

[32] R. C. Youngquist, L. F. Stokes, and H. J. Shaw, "Effects of normal node loss in dielectric waveguide directional couplers and interferometers," IEEE, J. of Quantum Electron., Vol. QE-19, No. 12, 1888 (1983).

[33] L. F. Mollenauer, J. P. Gordon and M. N. Islam, "Soliton propagation in long fibers with periodically compensated loss," IEEE Journal of Quant. Electron., Vol. QE-22, No. 1, 157 (1986).

We claim:

1. A rotation sensor interferometer comprising:
first means for producing an input signal pulse of electromagnetic radiation;
second means for producing input pump waves of electromagnetic radiation;
means for dividing said input signal pulse into a concurrent first and second signal pulse, and for dividing said input pump waves into a concurrent first and second pump waves;
third means optically aligned with said dividing means for providing a closed path for said first and second digital pulse to circulate thereabout;
in-line optical amplifying means in said third means for allowing said first and second signal pulse to circulate therein without energy depletion;
multiplexing coupling means optically interconnecting said dividing means with said path providing means for receiving said first and second signal pulse and for inputting and directing in opposite directions around said path said first and said second signal pulse, for nondestructively sampling said first and said second signal pulse after each pass therethrough and for extracting a first and a second signal pulse sample from said path once each circulation, and for coupling said pump waves in said closed path for pumping said in-line optical amplifying means, said coupling means being highly wavelength discriminating such that each of said first and second pump waves pass through said path providing means only a single time;
said dividing means being in optical alignment with said coupling means for receiving said first and said second pulse sample and directing said first and second pulse sample therefrom as an output;
detecting means in optical alignment with said dividing means for receiving said output and measuring the instantaneous relative phase shift between said first and said second pulse sample and providing an output in the form of a train of pulses containing phase information; and
means for receiving said output from said detecting means and converting said phase information into an indication of said rotation of said interferometer.

2. A reentrant fiber optic interferometer comprising:
an optical fiber, forming a loop for recirculating an optical signal in said loop, said loop of optical fiber comprising an active material which emits photons at a first wavelength in response to pumping at a second wavelength;

a source of signal light for inputting said optical signal to said loop for circulation therein, said optical signal having a wavelength substantially equal to a first wavelength;

a source of pump light for inputting pump light to said loop for propagation therethrough to optically pump said active material, said pump light having a wavelength substantially equal to said second wavelength such that photons are generated in said loop at the first wavelength to amplify said optical signal;

a splitting coupler for splitting said optical signal into a pair of optical signals which propagate around said loop in opposite directions and circulate in the loop;

a multiplexing coupler for closing said loop, said multiplexing coupler having different coupling ratios for said pump light and said optical signal such that only a fraction of each of the said pair of optical signals is coupled out of said loop on each circulation about said loop, but substantially all of said pump light is coupled out of said loop after a single circulation to prevent said pump light from recirculating in said loop and thereby suppress pump phase noise in said loop; and a detection system, coupled to said loop to receive at least a portion of the fraction of the pair of optical signals coupled out of the loop on each circulation, said detection system detecting phase differences between said pair of optical signals.

3. A reentrant fiber optic interferometer, as defined by claim 2, wherein said photons are generated by stimulated Raman scattering.

4. A reentrant fiber optic interferometer, as defined by claims 2, wherein said optical fiber comprises a polarization-preserving optical fiber.

5. A reentrant fiber optic interferometer, as defined by claim 2, wherein said optical signal and said pump signal have the same polarization in said loop.

6. A method of sensing rotation, comprising:

inputting an optical signal having a first wavelength into a loop of optical fiber comprising an active material which emits photons at said first wavelength in response to pumping at a second wavelength;

inputting pump light at said second wavelength into said loop for propagation therethrough to optically pump said active material such that photons are generated in said loop at the first wavelength to amplify the optical signal;

coupling only a fraction of said optical signal out of said loop after propagation therethrough such that said optical signal recirculates a plural number of times in said loop; and suppressing pump phase noise in the loop by coupling said pump light out of the loop after a single circulation to thereby prevent said pump light from recirculating in the loop.

7. A method of sensing rotation, as defined by claim 6, wherein said photons are generated by stimulated Raman scattering.

8. A method of sensing rotation, as defined by claim 6, wherein the pump light and the optical signal are polarized, the polarization of the pump light in the loop being the same as that of the optical signal.

* * * * *